US012520165B2

(12) United States Patent
Park et al.

(10) Patent No.: US 12,520,165 B2
(45) Date of Patent: Jan. 6, 2026

(54) METHOD BY WHICH UE PERFORMS INITIAL ACCESS TO BASE STATION IN WIRELESS COMMUNICATION SYSTEM, AND DEVICE THEREFOR

(71) Applicant: LG ELECTRONICS INC., Seoul (KR)

(72) Inventors: Sungho Park, Seoul (KR); Donghwan Kim, Seoul (KR); Minseog Kim, Seoul (KR); Sunam Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 451 days.

(21) Appl. No.: 17/800,513

(22) PCT Filed: Feb. 28, 2020

(86) PCT No.: PCT/KR2020/002882
§ 371 (c)(1),
(2) Date: Aug. 17, 2022

(87) PCT Pub. No.: WO2021/172631
PCT Pub. Date: Sep. 2, 2021

(65) Prior Publication Data
US 2023/0107283 A1    Apr. 6, 2023

(51) Int. Cl.
*H04W 16/28* (2009.01)
*H04W 48/08* (2009.01)
(Continued)

(52) U.S. Cl.
CPC ........... *H04W 16/28* (2013.01); *H04W 48/08* (2013.01); *H04W 74/08* (2013.01);
(Continued)

(58) Field of Classification Search
CPC ..... H04W 48/08; H04W 74/08; H04W 16/28; H04W 74/0833; H04B 7/04013; H01Q 15/148; H01Q 1/246
See application file for complete search history.

(56) References Cited

U.S. PATENT DOCUMENTS

2018/0192466 A1    7/2018 Park et al.
2019/0238191 A1    8/2019 Yoon et al.
(Continued)

OTHER PUBLICATIONS

Beixiong Zheng, et al., "Intelligent Reflecting Surface-Enhanced OFDM: Channel Estimation and Reflection Optimization", arXiv: 1909.03272v3 [cs. IT], Jan. 2020, 7 pages.
(Continued)

*Primary Examiner* — Huy D Vu
*Assistant Examiner* — Bao G Nguyen
(74) *Attorney, Agent, or Firm* — LEE, HONG, DEGERMAN, KANG & WAIMEY

(57) ABSTRACT

Various embodiments disclose a method by which a user equipment (UE) performs initial access to a base station by using a large intelligent surface (LIS) in a wireless communication system, and a device therefor. The method comprises the steps of: receiving, through the LIS, a UE search signal transmitted by the base station; transmitting an initial access signal to the base station through the LIS on the basis of resource allocation information included in the UE search signal; transmitting a first LIS control signal for controlling a reflection pattern of the LIS for an uplink signal; and receiving, through the LIS, an initial access response signal transmitted by the base station.

6 Claims, 26 Drawing Sheets

(51) Int. Cl.
  *H04W 74/08* (2009.01)
  *H04W 74/0833* (2024.01)
  *H04W 74/0836* (2024.01)
  *H04W 74/0838* (2024.01)

(52) U.S. Cl.
  CPC .... *H04W 74/0833* (2013.01); *H04W 74/0836* (2024.01); *H04W 74/0838* (2024.01)

(56) References Cited

U.S. PATENT DOCUMENTS

| | | | | |
|---|---|---|---|---|
| 2020/0112484 | A1* | 4/2020 | Sun | H04L 5/0094 |
| 2020/0296680 | A1* | 9/2020 | Akkarakaran | H04W 4/029 |
| 2021/0126694 | A1* | 4/2021 | Abedini | H04W 24/10 |
| 2021/0168880 | A1* | 6/2021 | Ohara | H04W 74/002 |
| 2022/0038238 | A1* | 2/2022 | Liu | H04L 5/0048 |
| 2022/0174697 | A1* | 6/2022 | Jung | H04L 1/0003 |
| 2022/0216909 | A1* | 7/2022 | Bengtsson | H04B 7/145 |
| 2022/0393781 | A1* | 12/2022 | Kim | G06N 3/08 |
| 2022/0400478 | A1* | 12/2022 | Du | H04B 7/026 |
| 2023/0284264 | A1* | 9/2023 | Kim | H04W 74/006 370/329 |

OTHER PUBLICATIONS

QingQing, et al., "Intelligent Reflecting Surface Enhanced Wireless Network: Joint Active and Passive Beamforming Design", arXiv: 1809.01423v2 [cs. IT], Sep. 2018, 8 pages.

Minchae Jung, et al., "On the Optimality of Reconfigurable Intelligent Surfaces (RISs): Passive Beamforming, Modulation, and Resource Allocation", arXiv: 1910.00968v1 [cs. IT], Oct. 2019, 33 pages.

PCT International Application No. PCT/KR2020/002882, International Search Report dated Nov. 20, 2020, 3 pages.

* cited by examiner (a)

(b)

(a)

(b)

(a)

(b)

METHOD BY WHICH UE PERFORMS INITIAL ACCESS TO BASE STATION IN WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2020/002882, filed on Feb. 28, 2020, the contents of which are all incorporated by reference herein in their entireties.

TECHNICAL FIELD

Embodiments of the present disclosure relate to a method for allowing a user equipment (UE) to perform initial access to a base station (BS) using a large intelligent surface (LIS) in a wireless communication system, and a device for the same.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between UEs without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

On the other hand, a large intelligent surface (LIS) may serve as a reflective plate formed of a meta-material, and may be a configuration in which a reflection pattern of incident electromagnetic waves can be adjusted. Here, the meta-material is a material formed when artificial "meta-atoms" formed of metal or dielectric materials are periodically arranged in a space with a size much smaller than a wavelength. A meta-plane may be implemented by arranging the above-described meta-material in a two-dimensional (2D) plane. Since the meta-atoms constituting the meta-plane can programmatically control a voltage level, the LIS may constitute a variable reflection pattern according to the channel environment. If reflection patterns of electromagnetic waves are collected in the desired direction through control of the reflection pattern of the LIS, the beamforming effect of the array antenna can be obtained. The LIS is configured as passive element(s) to reduce power consumption, and is cheaper than the existing small cell or a distributed antenna system, so that the LIS can be used to solve indoor shadow areas using smaller numbers of OPEXes/CAPEXes.

Alternatively, the LIS may be configured as a meta-surface composed of unit cell(s). The LIS may include a storage device for storing information about a predefined beam pattern (or a reflection pattern) and/or information about a voltage level distribution for each unit cell. The LIS may pre-store information on a beam pattern (or a reflection pattern) for UE search and/or information on a beam pattern (or a reflection pattern) for data transmission/reception (Tx/Rx) relay. In addition, the LIS may further include a control device for controlling a voltage regulator for the beam pattern and the meta-surface. Furthermore, the LIS may include a device for receiving and processing a LIS beam control signal command for signals necessary for an initial access procedure.

However, the conventional LIS operation is not provided with a separate communication link and process. Thus, if the LIS is installed to have a specific reflection pattern at a specific position, it is difficult for the LIS to change the reflection pattern and support a mobile terminal.

DISCLOSURE

Technical Problem

An object of the present disclosure is to provide a method for allowing a user equipment (UE) located in a shadow area of a base station (BS) to effectively control a reflection pattern of a large intelligent surface (LIS) in the existing resource region, so that the UE can smoothly perform legacy initial access to the BS within the LIS-based shadow area.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Technical Solutions

In accordance with one aspect of the present disclosure, a method for performing initial access to a base station using a large intelligent surface (LIS) by a user equipment (UE) in a wireless communication system may include receiving a UE search signal transmitted by the base station through the LIS, transmitting an initial access signal to the base station through the LIS based on resource allocation information included in the UE search signal, transmitting a first LIS control signal for controlling a reflection pattern of the LIS for an uplink signal, and receiving an initial access response signal transmitted by the base station through the LIS.

The resource allocation information may include information on a control period in which the first LIS control signal is transmitted.

The control period in which the first LIS control signal is transmitted may be allocated within a cyclic prefix (CP) period of an orthogonal frequency division multiplexing (OFDM) symbol or within a pre-configured guard interval.

The end timing point of the control period in which the first LIS control signal is transmitted may correspond to an end timing point of the CP period.

The initial access signal may be transmitted in a signal transmission period included in the resource allocation information, wherein the signal transmission period is located after lapse of a predetermined offset from an end timing point of the control period.

The offset may be predetermined based on acquisition of the first LIS control signal and a transition time of the reflection pattern of the LIS.

The UE search signal may further include a base station (BS) identifier, a beam index of the base station (BS), an identifier for the LIS, and information on a beam index for the LIS.

The first LIS control signal may instruct a cyclic shift (CS) of the reflection pattern of the LIS with respect to the uplink signal.

The UE search signal may be received in at least one beam direction; and the initial access signal may be transmitted in a first beam direction determined based on the at least one beam direction.

The first beam direction may be determined based on a second beam direction in which a UE search signal having the highest reception strength from among the at least one beam direction is received.

The first LIS control signal may further include beam direction information related to the second direction, and is then transmitted to the LIS.

The initial access response signal may include first information on a beam of the LIS for uplink instructed by the base station, and second information on a beam of the LIS for downlink.

The method may further include transmitting, based on the first information included in the initial access response signal, a second LIS control signal for controlling the reflection pattern of the LIS for the uplink.

In accordance with another aspect of the present disclosure, a user equipment (UE) for performing initial access to a base station using a large intelligent surface (LIS) by a user equipment (UE) in a wireless communication system may include a radio frequency (RF) transceiver, and a processor connected to the RF transceiver, wherein the processor is configured to receive a UE search signal transmitted by the base station through the LIS, under control of the RF transceiver, transmit an initial access signal to the base station through the LIS based on resource allocation information included in the UE search signal, and transmit a first LIS control signal for controlling a reflection pattern of the LIS for an uplink signal.

In accordance with another aspect of the present disclosure, a method for performing initial access to a base station using a large intelligent surface (LIS) in a wireless communication system may include a memory configured to store a program related to initial access to a base station using the LIS, and a processor configured to perform initial access to the base station based on the program stored in the memory, wherein the processor is configured to acquire information related to a UE search signal of the base station from the memory, generate an initial access signal based on resource allocation information included in the UE search signal, and generate a first LIS control signal for controlling a reflection pattern of the LIS with respect to an uplink signal.

The processor may be configured to control a driving mode of a device connected to the chipset, based on the first LIS control signal.

Advantageous Effects

Various embodiments of the present disclosure can allow the UE located in a shadow area of the BS to effectively control the reflection pattern of the large intelligent surface (LIS) within the existing resource region, so that the UE can smoothly perform legacy initial access to the BS in the LIS-based shadow area.

According to various embodiments, a terminal may perform quick beam transmission, beam acquisition, and beam tracking by performing cooperative beam sweeping with other terminals in a group based on group information or cooperation information.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE

Figure 1:
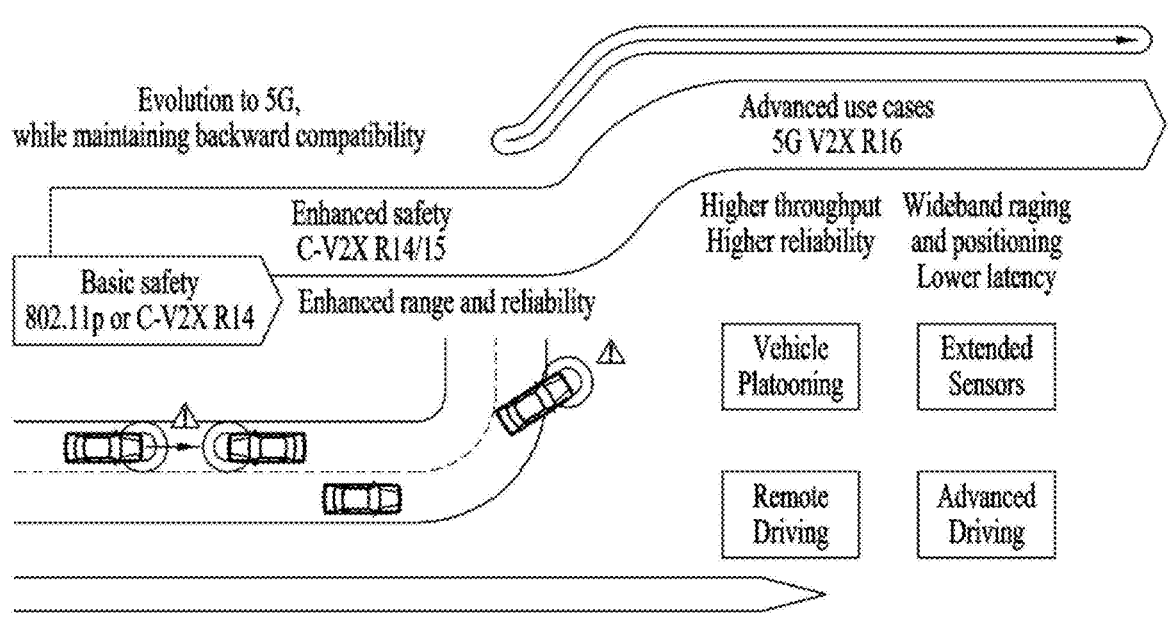
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency millimeter wave) bands above 24 GHz.

Figure 2:
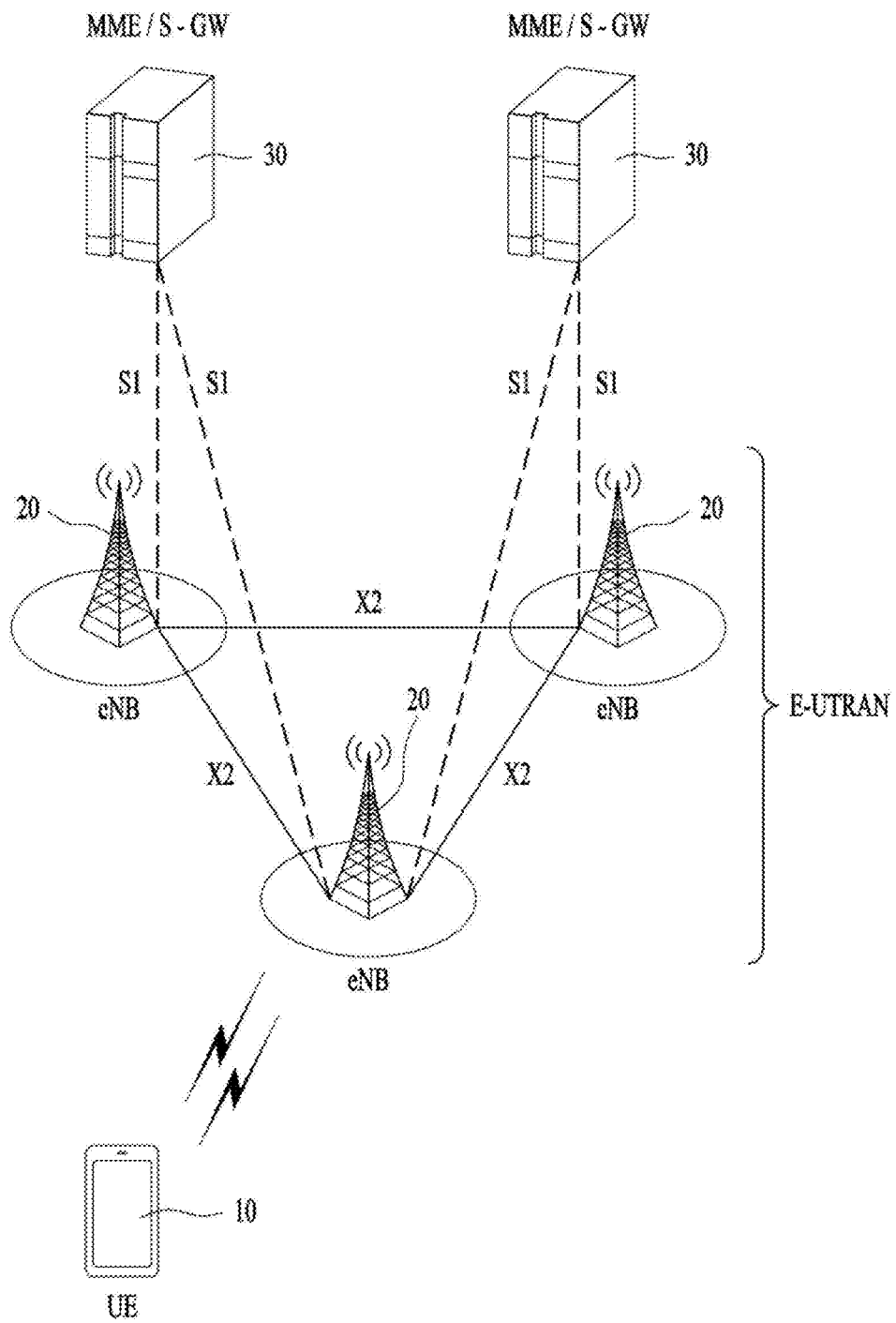
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user UE (UT), subscriber station (SS), mobile UE (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
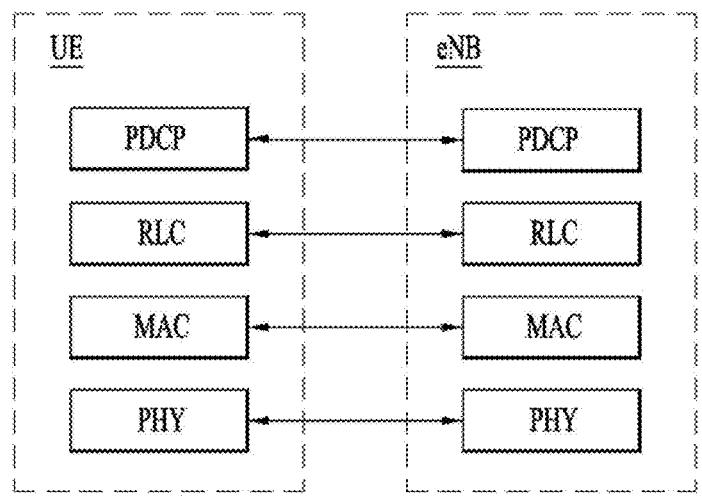
FIG. 3 illustrates a user-plane radio protocol architecture to which embodiment(s) are applicable.

FIG. 3 illustrates a user-plane radio protocol architecture to which the present disclosure is applicable.

Figure 4:
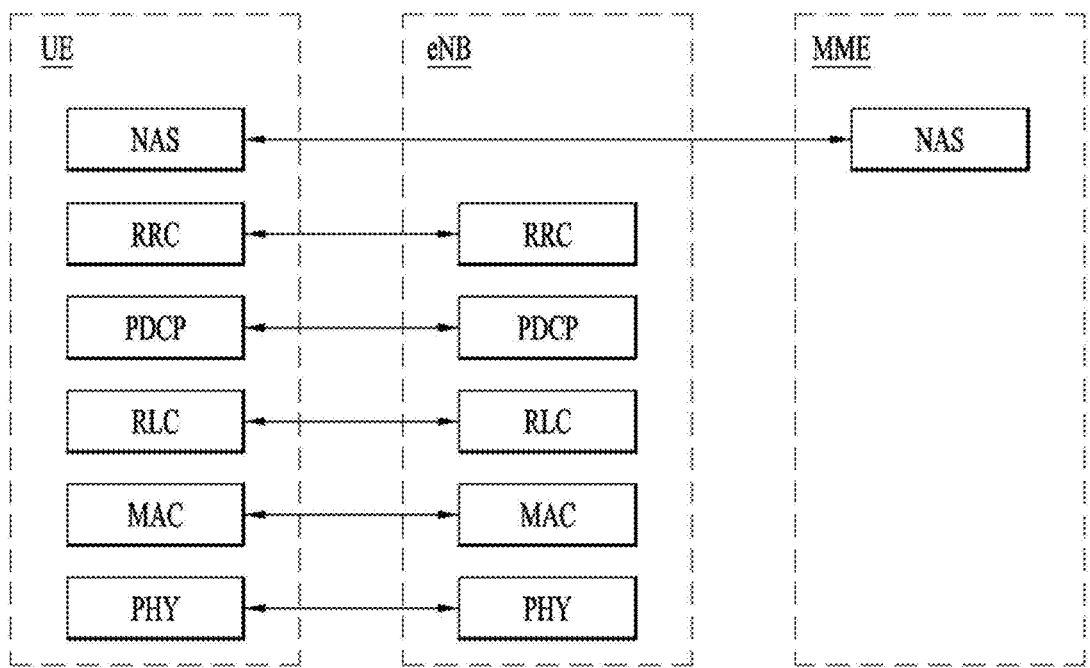
FIG. 4 illustrates a control-plane radio protocol architecture to which embodiment(s) are applicable.

FIG. 4 illustrates a control-plane radio protocol architecture to which the present disclosure is applicable. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 5:
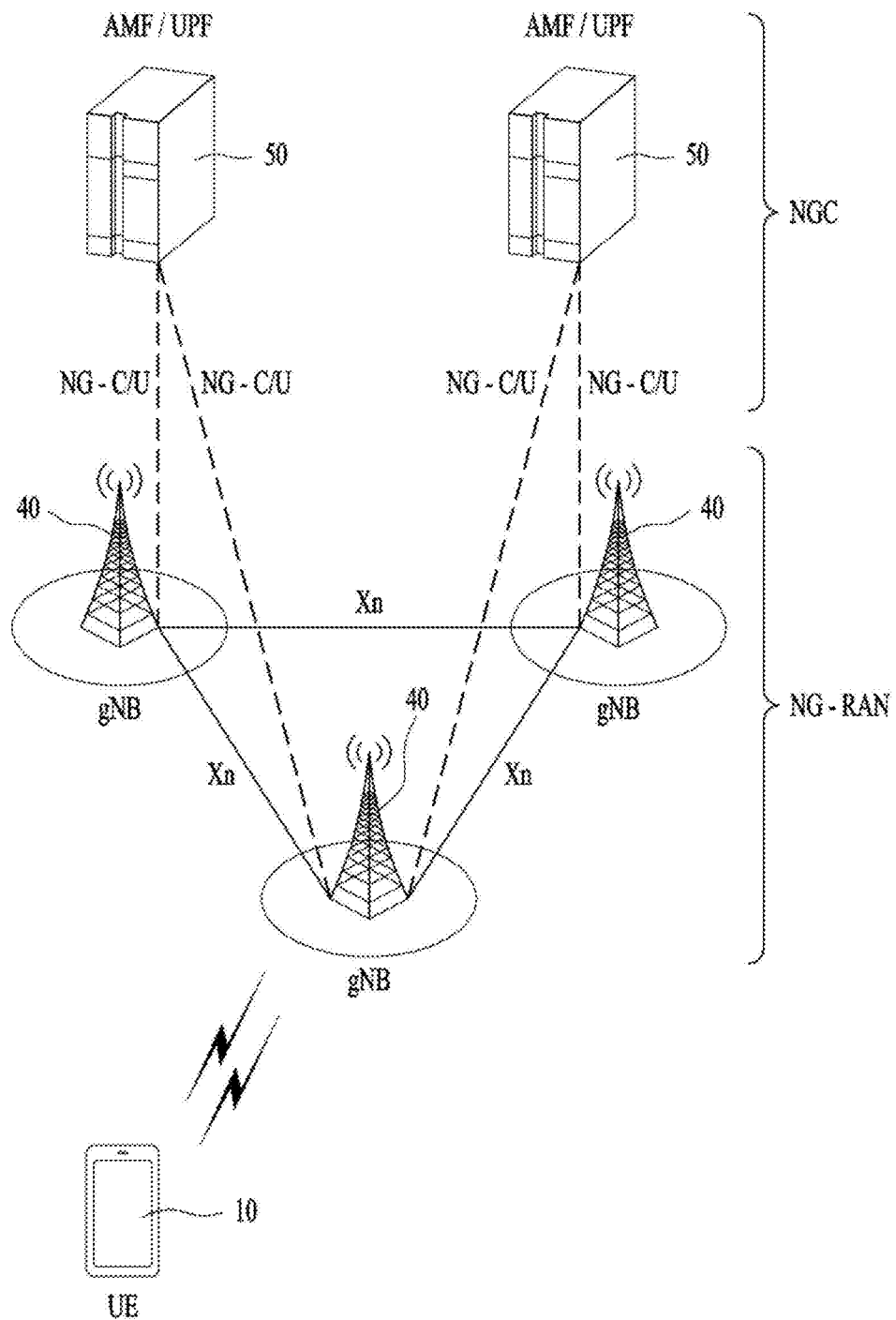
FIG. 5 illustrates the structure of an NR system to which embodiment(s) are applicable.

FIG. 5 illustrates the structure of a NR system to which the present disclosure is applicable.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
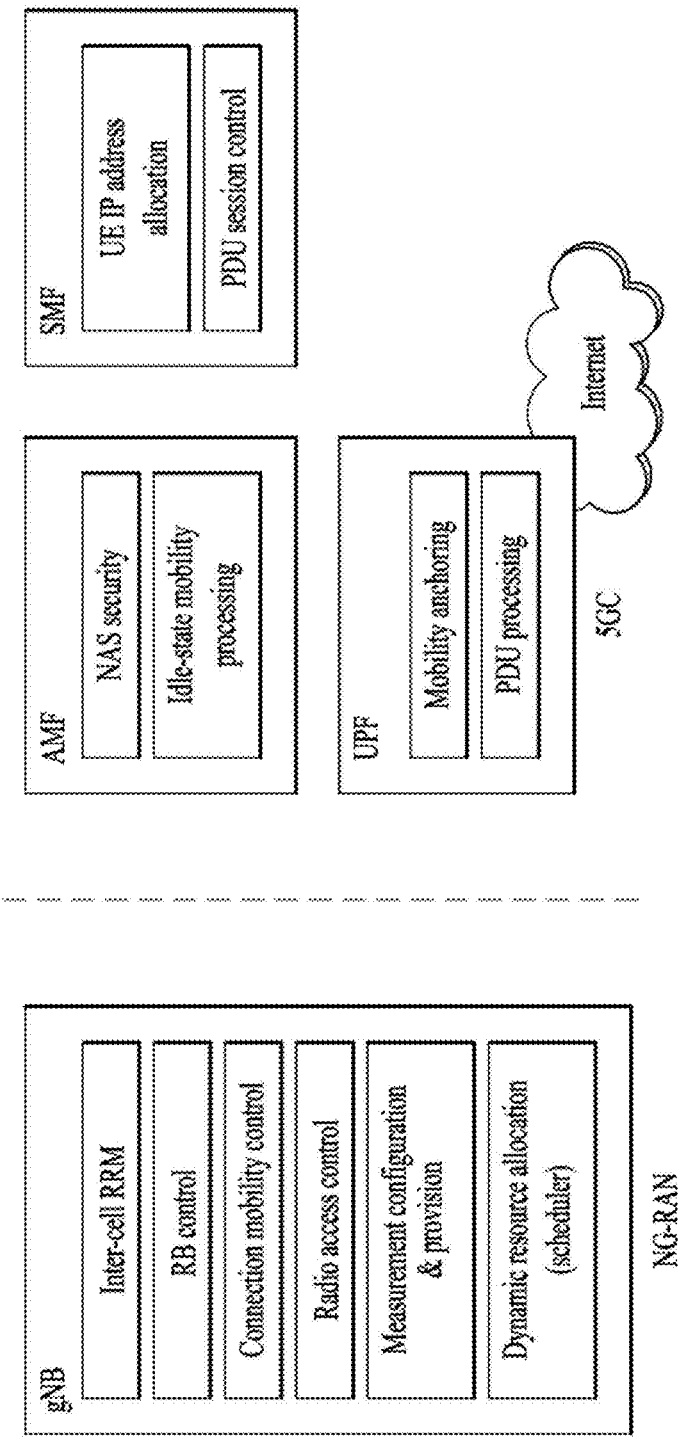
FIG. 6 illustrates functional split between an NG-RAN and a 5GC to which embodiment(s) are applicable.

FIG. 6 illustrates functional split between the NG-RAN and the 5GC to which the present disclosure is applicable.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
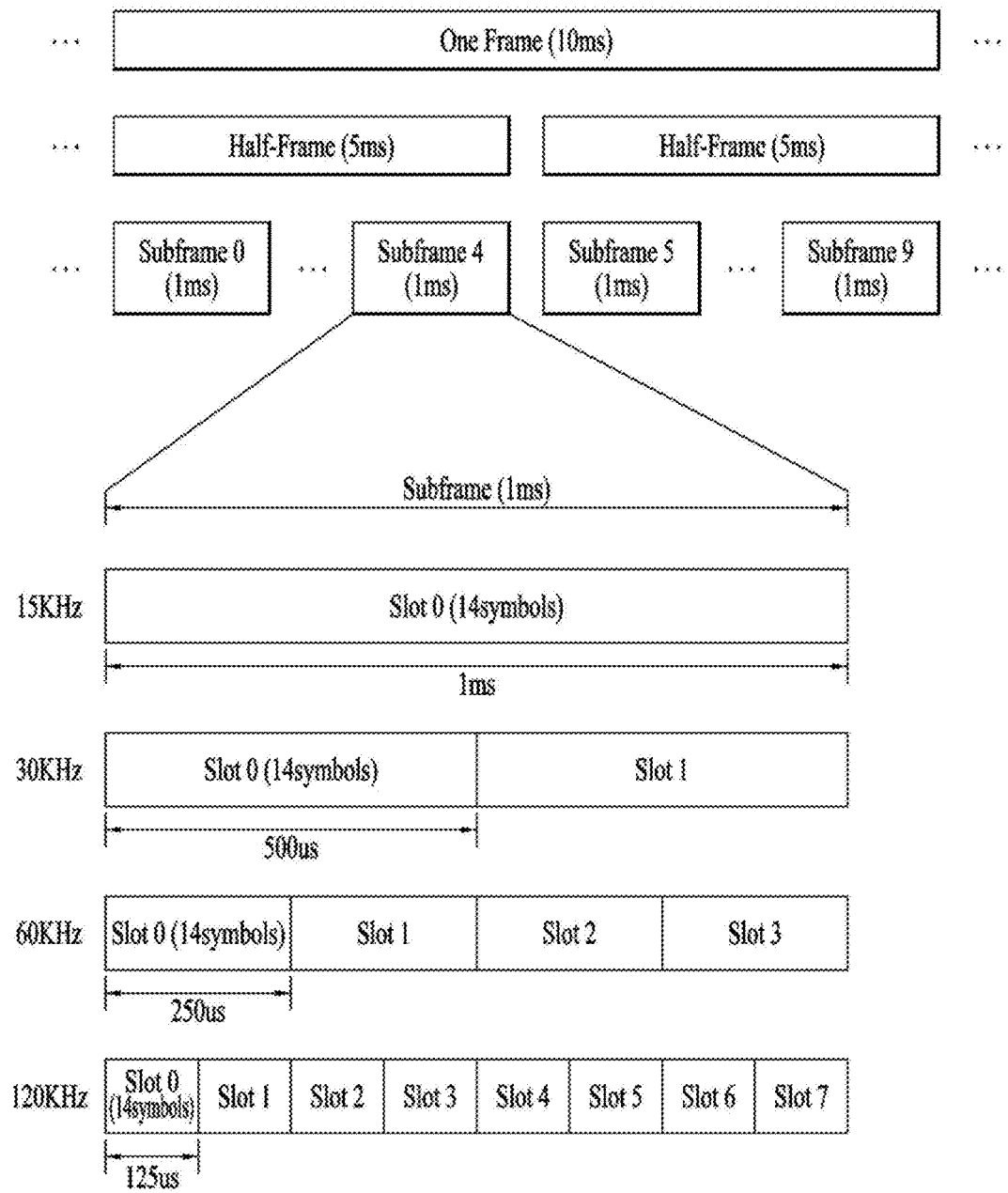
FIG. 7 illustrates the structure of an NR radio frame to which embodiment(s) are applicable.

FIG. 7 illustrates the structure of a NR radio frame to which the present disclosure is applicable.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration µ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 8:
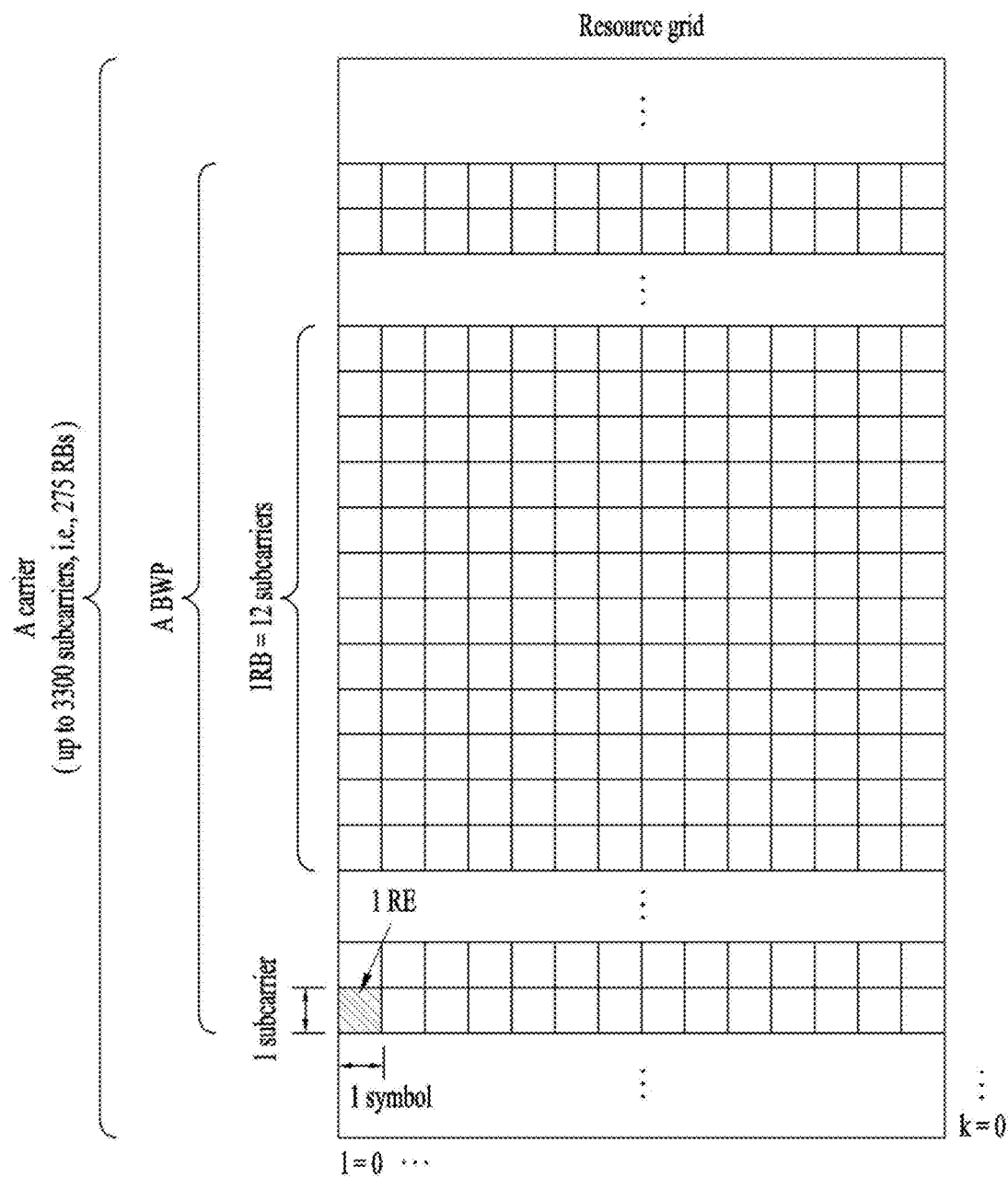
FIG. 8 illustrates the slot structure of an NR frame to which embodiment(s) are applicable.

FIG. 8 illustrates the slot structure of a NR frame to which the present disclosure is applicable.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 9:
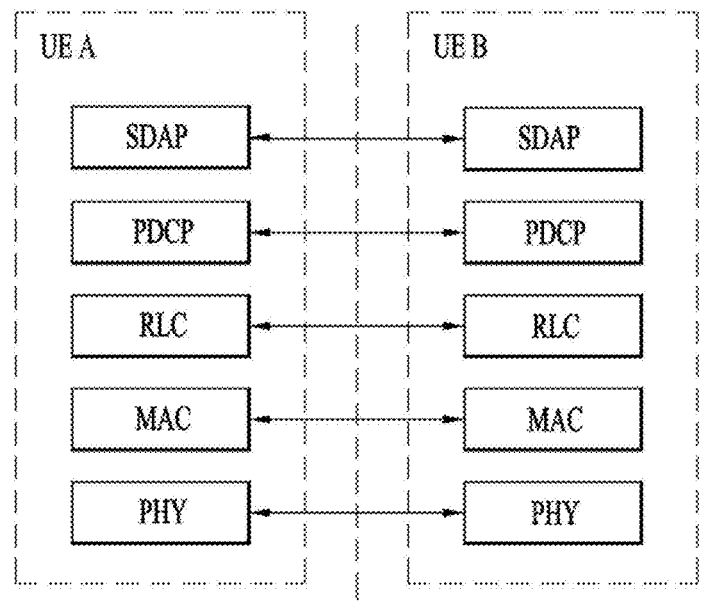
FIG. 9 illustrates a radio protocol architecture for SL communication.
Figure 9:
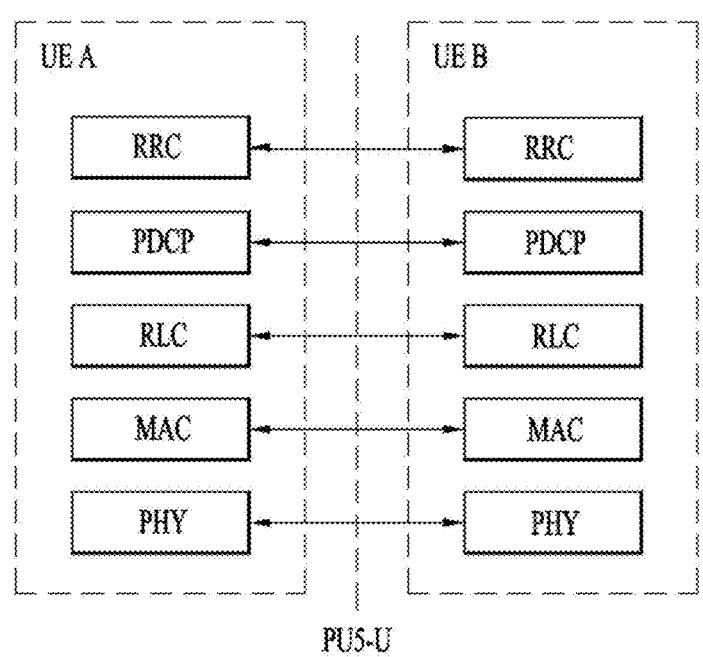

FIG. 9 illustrates a radio protocol architecture for SL communication.

Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
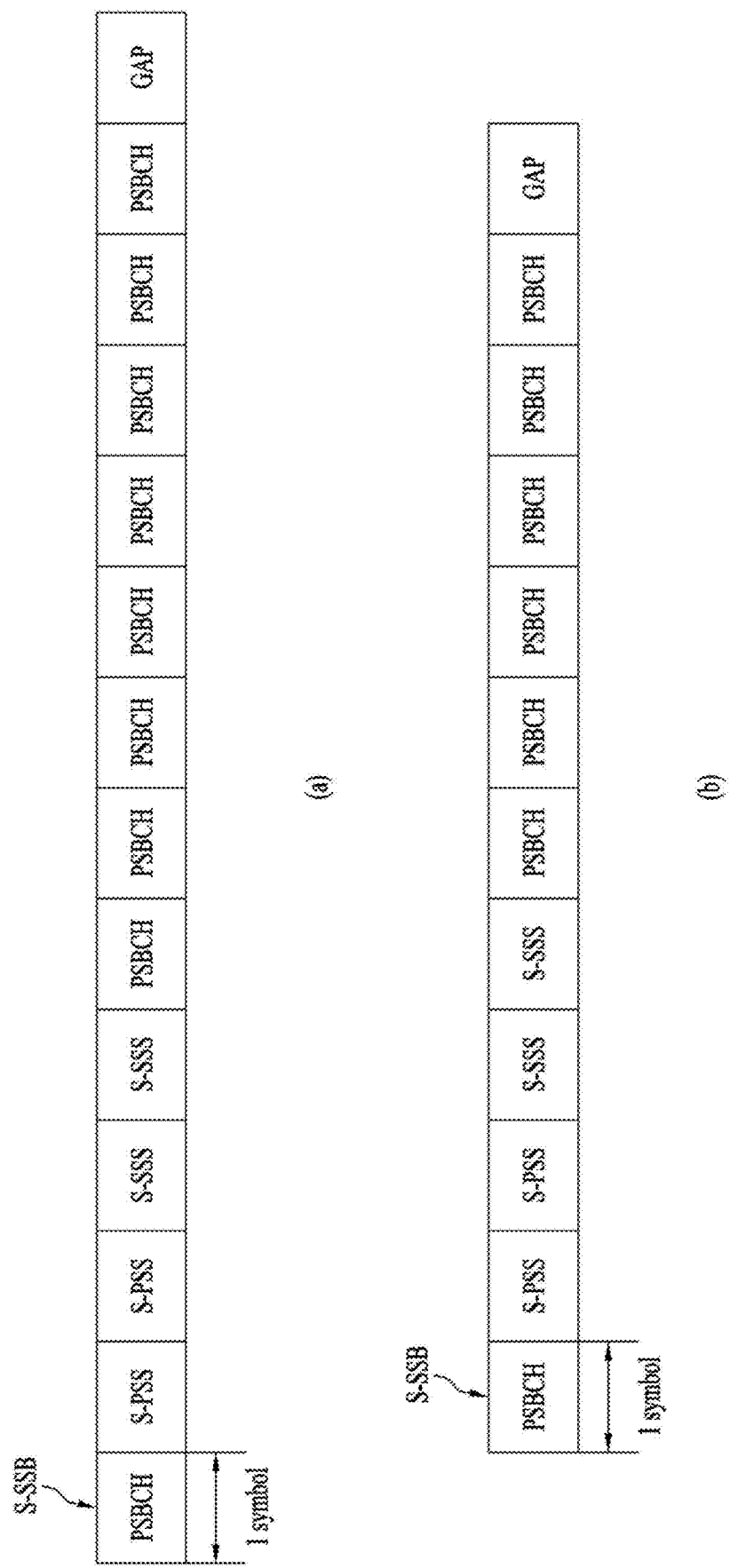
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
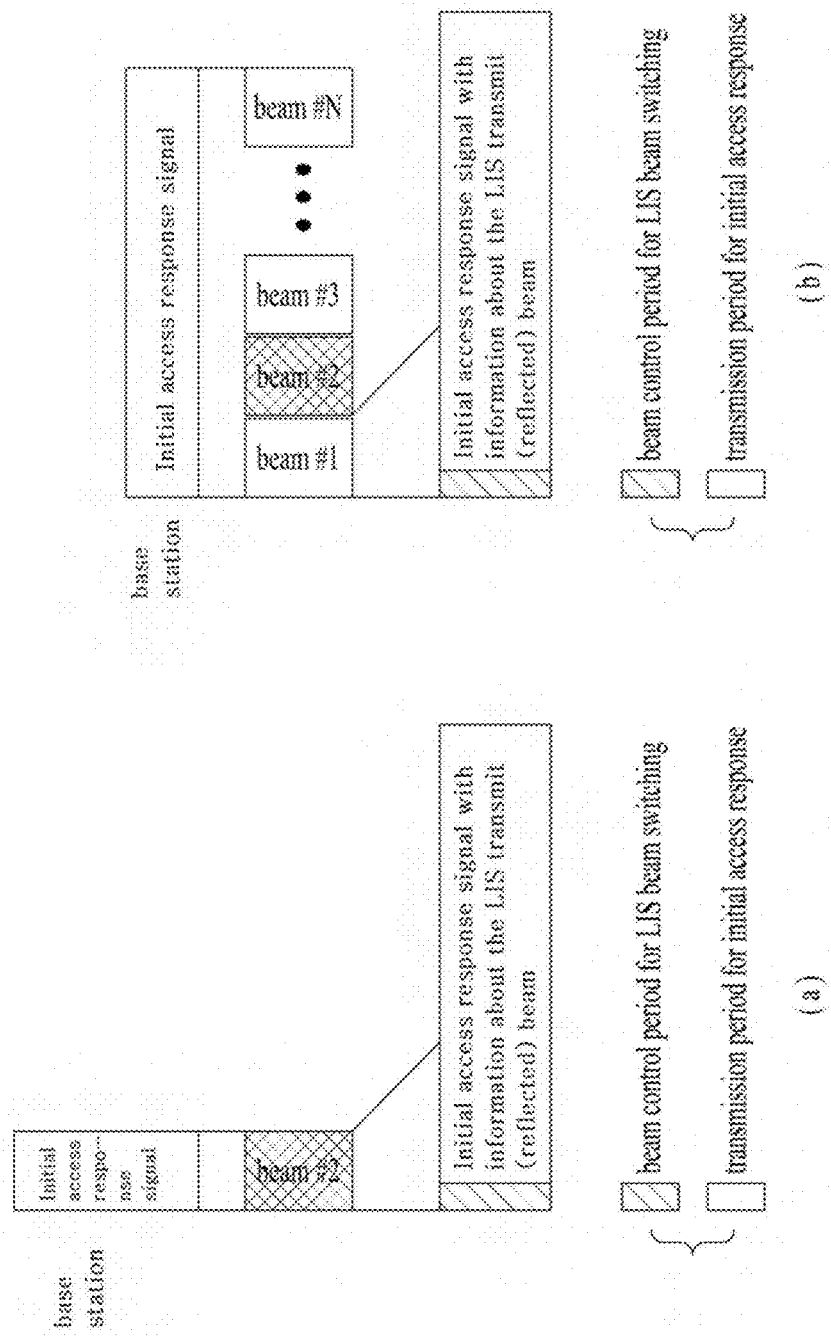
FIG. 20 is a diagram illustrating a method for allowing the BS to transmit an initial access response signal to the UE through the LIS within an initial access response period.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 to 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 µs. For example, in the case of FR2, the transition period may be 5 µs. For example, a search window in which the receiving UE is to detect the S-PSS may be 80 ms and/or 160 ms.

Figure 11:
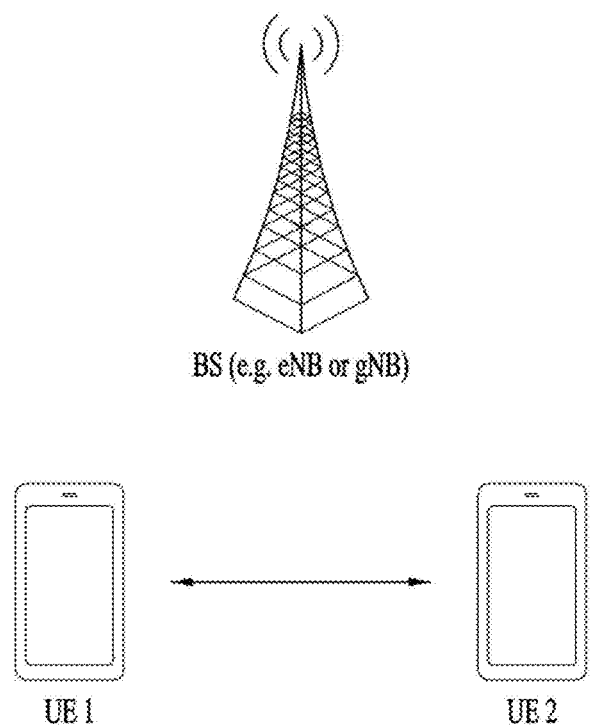
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
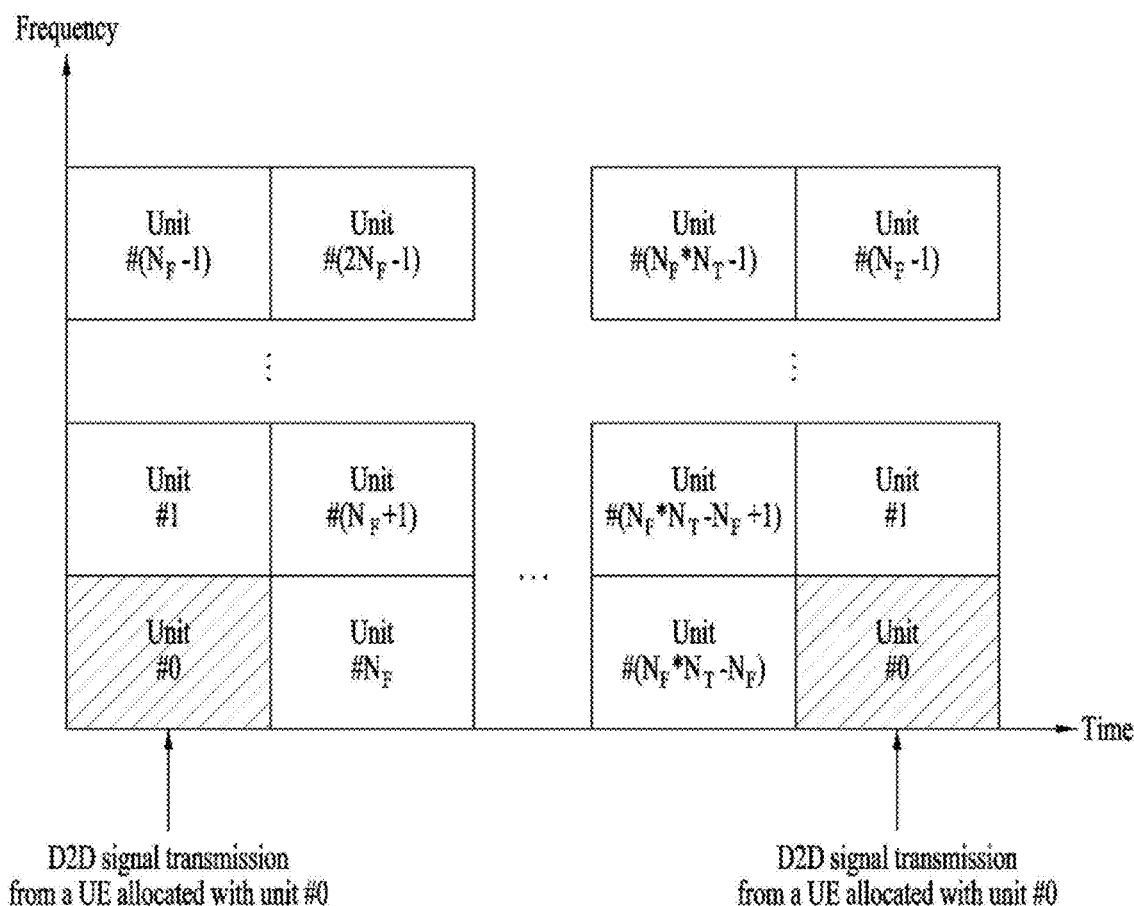
FIG. 12 illustrates resource units for V2X or SL communication.

FIG. 12 illustrates resource units for V2X or SL communication.

Referring to FIG. 12, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 12 shows an exemplary case where the resource pool is repeated with a periodicity of $N_T$ subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 13:
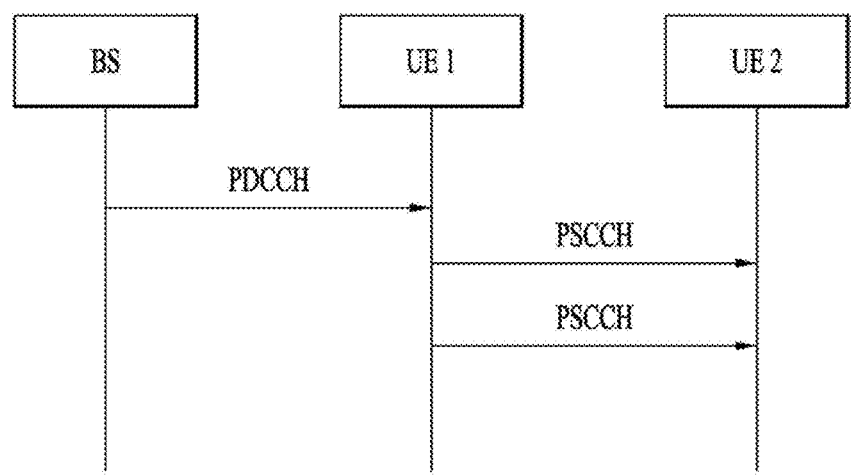
FIG. 13 illustrates a procedure in which UEs perform V2X or SL communication according to a transmission mode.
Figure 13:
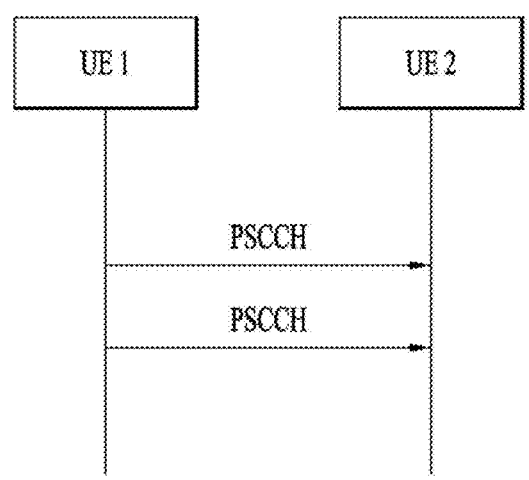

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(a) illustrates a UE operation related to LTE transmission mode 1 or LTE transmission mode 3. Alternatively, for example, FIG. 24-(a) illustrates a UE operation related to NR resource allocation mode 1. For example, LTE transmission mode 1 may be applied to general SL communication, and LTE transmission mode 3 may be applied to V2X communication.

For example, FIG. 13-(b) illustrates a UE operation related to LTE transmission mode 2 or LTE transmission mode 4. Alternatively, for example, FIG. 24-(b) illustrates a UE operation related to NR resource allocation mode 2.

Referring to FIG. 13-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may represent a slot offset between DCI reception and a first SL transmission scheduled by DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 14:
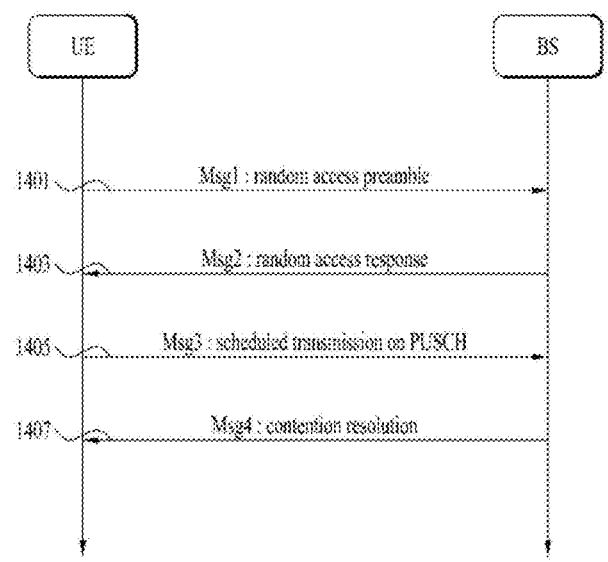
FIG. 14 is a diagram illustrating an example of a random access procedure to which various embodiments are applicable.
Figure 14:
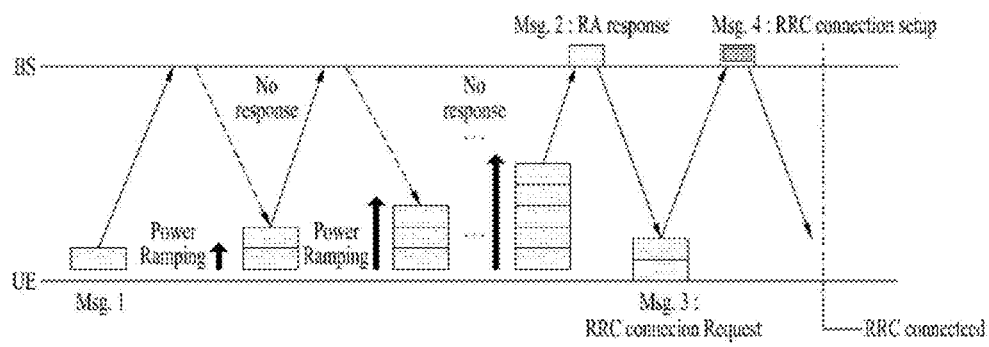

FIG. 14 is a diagram illustrating an example of a random access procedure to which various embodiments are applicable.

Referring to FIG. 14, When a (contention-based) RACH procedure is performed in four steps (4-step RACH procedure), the UE may transmit a message (Message 1 (Msg 1)) including a preamble related to a specific sequence on a PRACH (1401) and receive a PDCCH and an RAR message (Message 2 (Msg 2)) on a PDSCH corresponding to the PDCCH in response to the preamble (1403). The UE may transmit a message (Message 3 (Msg 3)) including a PUSCH by using scheduling information included in the RAR (1405) and perform a contention resolution procedure such as reception of a PDCCH signal and a PDSCH signal corresponding to the PDCCH signal. The UE may receive a message (Message 4 (Msg 4)) including contention resolution information for the contention resolution procedure from the BS (1407).

The 4-step RACH procedure of the UE may be summarized in Table 5 below.

TABLE 5

| | Type of Signals | Operations/Information Acquired |
|---|---|---|
| $1^{st}$ step | PRACH preamble in UL | Initial beam acquisition<br>Random election of RA-preamble ID |
| $2^{nd}$ Step | Random Access Response on DL-SCH | Timing alignment information<br>RA-preamble ID<br>Initial UL grant, Temporary C-RNTI |
| $3^{rd}$ Step | UL transmission on UL-SCH | RRC connection request<br>UE identifier |
| $4^{th}$ Step | Contention Resolution on DL | Temporary C-RNTI on PDCCH for initial access<br>C-RNTI on PDCCH for UE in RRC_CONNECTED |

First, the UE may transmit an RACH preamble as Msg 1 on a PRACH in an RACH procedure.

Random access preamble sequences of two different lengths are supported. The length 839 of the longer sequence is applied to the SCSs of 1.25 kHz and 5 kHz, whereas the length 139 of the shorter sequence is applied to the SCSs of 15 kHz, 30 kHz, 60 kHz, and 120 kHz.

Multiple preamble formats are defined by one or more RACH OFDM symbols and different CPs (and/or guard times). An RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit an RACH preamble in RACH resources associated with the selected SSB.

Upon receipt of the RACH preamble from the UE, the BS transmits an RAR message (Msg 2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive an RAR on a PDSCH scheduled by DCI carried on the PDCCH. The UE determines whether the RAR includes RAR information for its transmitted preamble, that is, Msg 1. The UE may make the determination by checking the presence or absence of the RACH preamble ID of its transmitted preamble in the RAR. In the absence of the response to Msg 1, the UE may retransmit the RACH preamble a predetermined number of or fewer times, while performing power ramping. The UE calculates PRACH transmission power for a preamble retransmission based on the latest path loss and a power ramping counter.

The RAR information may include the preamble sequence transmitted by the UE, a cell RNTI (C-RNTI) that the BS has allocated to the UE attempting random access, UL transmit time alignment information, UL transmission power adjustment information, and UL radio resource allocation information. Upon receipt of its RAR information on the PDSCH, the UE may acquire time advance information for UL synchronization, an initial UL grant, and a temporary C-RNTI. The timing advance information is used to control a UL signal transmission timing. To align a PUSCH and/or PUCCH transmission of the UE with a subframe timing of a network end, the network (e.g., the BS) may measure the time difference between PUSCH, PUCCH, or SRS reception and a subframe and transmit the timing advance information based on the time difference. The UE may transmit a UL signal as Msg 3 of the RACH procedure on a UL-SCH based on the RAR information. Msg 3 may include an RRC connection request and a UE ID. The network may transmit Msg 4 in response to Msg 3. Msg 4 may be handled as a contention resolution message on DL. As the UE receives Msg 4, the UE may enter the RRC_CONNECTED state.

As described before, the UL grant included in the RAR schedules a PUSCH transmission for the UE. A PUSCH carrying an initial UL transmission based on the UL grant of the RAR is referred to as an Msg 3 PUSCH.

A (contention-based) RACH procedure performed in two steps, that is, a 2-step RACH procedure has been proposed to simplify the RACH procedure and thus achieve low signaling overhead and low latency In the 2-step RACH procedure, the operation of transmitting Msg 1 and the operation of transmitting Msg 3 in the 4-step RACH procedure may be incorporated into an operation of transmitting one message, Message A (Msg A) including a PRACH and a PUSCH by the UE. The operation of transmitting Msg 2 by the BS and the operation of transmitting Msg 4 by the BS in the 4-step RACH procedure may be incorporated into an operation of transmitting one message, Message B (Msg B) including an RAR and contention resolution information.

That is, in the 2-step RACH procedure, the UE may combine Msg 1 and Msg 3 of the 4-step RACH procedure into one message (e.g., Msg A) and transmit the message to the BS.

Further, in the 2-step RACH procedure, the BS may combine Msg 2 and Msg 4 of the 4-step RACH procedure into one message (e.g., Msg B) and transmit the message to the UE.

The 2-step RACH procedure may become a low-latency RACH procedure based on the combinations of these messages.

More specifically, Msg A may include a PRACH preamble included in Msg 1 and data included in Msg 3 in the 2-step RACH procedure. In the 2-step RACH procedure, Msg B may include an RAR included in Msg 2 and contention resolution information included in Msg 4.

Also, The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure. Information about the dedicated RACH preamble may be included in an RRC message (e.g., a handover command) or provided to the UE by a PDCCH order. When the RACH procedure starts, the UE transmits the dedicated RACH preamble to the BS. When the UE receives an RAR from the BS, the RACH procedure is completed.

In the contention-free RACH procedure, a CSI request field in an RAR UL grant indicates whether the UE is to include an aperiodic CSI report in a corresponding PUSCH transmission. An SCS for Msg 3 PUSCH transmission is provided by an RRC parameter. The UE may transmit the PRACH and the Msg 3 PUSCH on the same UL carrier of the same serving cell. A UL BWP for the Msg 3 PUSCH transmission is indicated by SIB 1.

Large Intelligent Surface (LIS)

On the other hand, a large intelligent surface (LIS) may serve as a reflective plate formed of a meta-material, and may be a configuration in which a reflection pattern of incident electromagnetic waves can be adjusted. Here, the meta-material is a material formed when artificial "meta-atoms" formed of metal or dielectric materials are periodically arranged in a space with a size much smaller than a wavelength. A meta-plane may be implemented by arranging the above-described meta-material in a two-dimensional (2D) plane. Since the meta-atoms constituting the meta-plane can programmably control a voltage level, the LIS may constitute a variable reflection pattern according to the channel environment. If reflection patterns of electromagnetic waves are collected in the desired direction through control of the reflection pattern of the LIS, the beamforming effect of the array antenna can be obtained. The LIS is configured as passive element(s) to reduce power consumption, and is cheaper than the existing small cell or a distributed antenna system, so that the LIS can be used to solve indoor shadow areas using smaller numbers of OPEXes/CAPEXes.

Alternatively, the LIS may be configured as a meta-surface composed of unit cell(s). The LIS may include a storage device for storing information about a predefined beam pattern (or a reflection pattern) and/or information about a voltage level distribution for each unit cell. The LIS may pre-store information on a beam pattern (or a reflection pattern) for UE search and/or information on a beam pattern (or a reflection pattern) for data transmission/reception (Tx/Rx) relay. In addition, the LIS may further include a control device for controlling a voltage regulator for the beam pattern and the meta-surface. Furthermore, the LIS may include a device for receiving and processing a LIS beam control signal command for signals necessary for an initial access procedure.

However, the conventional LIS operation is not provided with a separate communication link and process. Thus, if the LIS is installed to have a specific reflection pattern at a specific position, it is difficult for the LIS to change the reflection pattern and support a mobile terminal.

Therefore, in order to apply the existing beam acquisition method between the UE and the BS to the relationship between the LIS and the UE, a digital baseband signal process for channel estimation and beam selection between the UE and the LIS may be required unlike the original purposes of the LIS. Therefore, there is needed a method for effectively supporting a mobile terminal located in a shadow area by dynamically controlling the LIS reflection pattern while maintaining low cost and low complexity according to the purpose of the existing LIS.

Communicate Using the Reflection Function of LIS

The large intelligent surface (LIS) may be used to provide a smooth communication environment between the UE and the BS in a shadow area located in a base station (BS) coverage indicating a BS service region. In this regard, the BS and/or the UE may perform communication using the LIS relay by controlling a beam transition operation of the LIS in the process of performing the initial access procedure. That is, the BS and/or the UE may perform communication using the reflection function of the LIS by controlling uplink/downlink (UL/DL) reflection patterns of the LIS within a shadow area of the BS.

A separate section for controlling the LIS beam transition operation can be defined in relation to the initial access procedure of the UE located in the LIS of the base station (BS) and a structure of signals required for such initial access procedure. In accordance with the present disclosure, the BS can be configured to appropriately control the LIS by selecting the UL/DL reflection patterns of the LIS that is optimal for forming a communication link between the UE and the LIS. In accordance with the present disclosure, the BS or the UE can control the LIS beam without additional communication channels for LIS beam control. Specifically, the UE or the BS may perform communication through the LIS using signal resources distinguished from the existing synchronization and initial access signal resources.

Through the above-described configurations, the existing UE and the existing BS can effectively control, based on the initial access performance procedure, the beam of the LIS in which a separate communication link to the BS is not present. In this case, the present disclosure can improve UE and system performance at a minimum cost by enabling UE communication within the shadow area. In addition, the present disclosure can implement massive MIMO at a low cost and can obtain a beam gain using the massive MIMO.

Specifically, according to the present disclosure, when a shadow area is present in the BS coverage, a reflector having a variable reflection pattern, such as a large intelligent surface (LIS), may be installed for smooth wireless communication in the shadow area, such that the reflector can be effectively controlled. The present disclosure can guarantee smooth communication with the UE within the shadow area where the existing service was impossible, through control of the LIS reflection pattern.

For example, in a situation where the UE enters the shadow area, if there is no other BS to which the UE can be handed over, a communication link may be disconnected. In this case, the UE may continuously attempt to perform the initial access procedure to re-establish a communication link with the BS. At this time, if the LIS having a beam coverage that can cover the shadow area is present in the BS coverage, the UE can connect the communication link to the BS through the LIS. At this time, the UE and the BS can exchange beam control signals with each other through the operation related to detection of signals belonging to the same band without using a heterogeneous network (e.g., Bluetooth, Wi-Fi, etc.) including a separate wired network for beam control of the LIS. In addition, in wireless communication between the UE and the BS, a signal having used the LIS may be configured to be distinguished from a signal used for direct communication between the BS and the UE.

Figure 15:
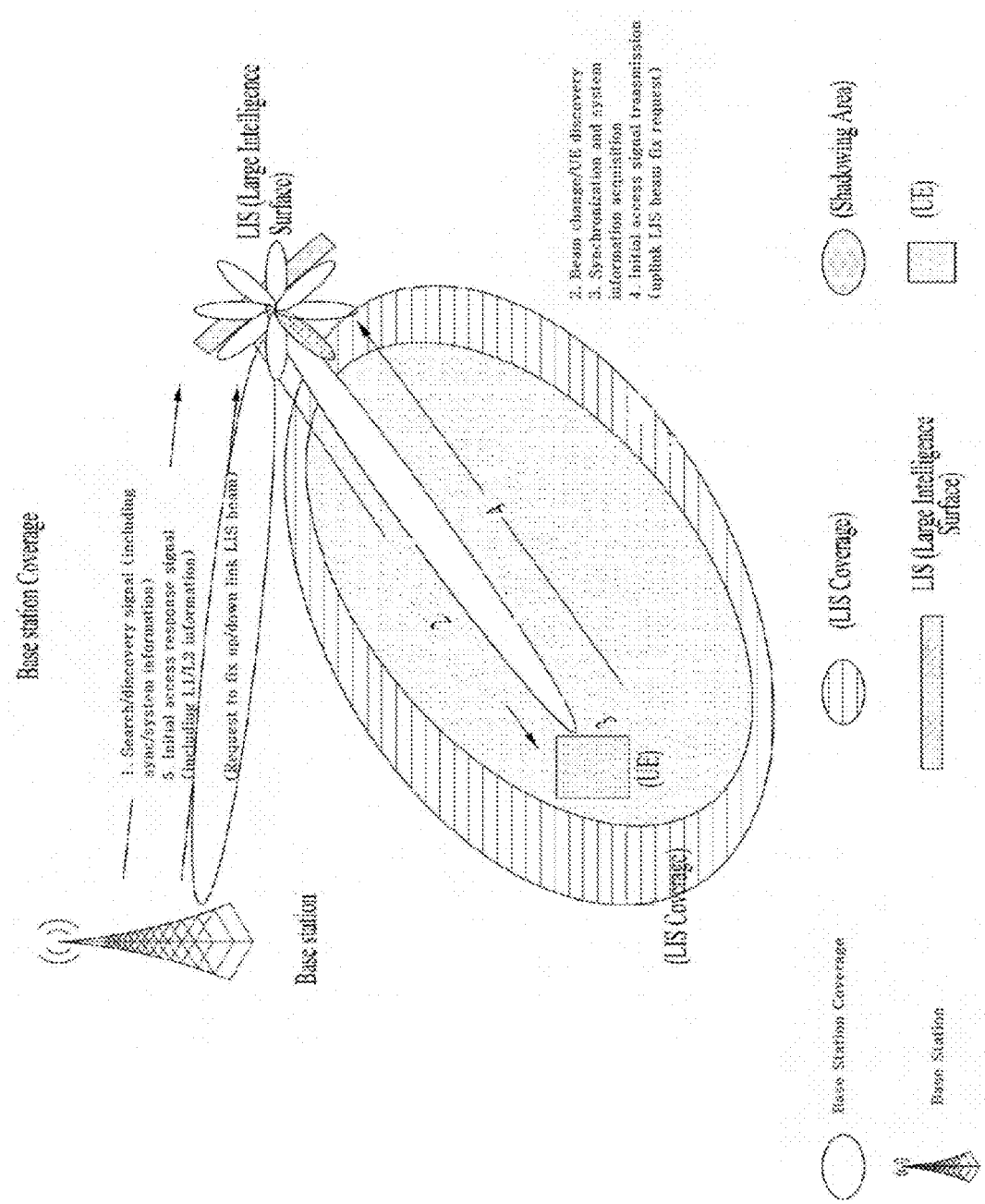
FIG. 15 is a diagram illustrating a method for allowing the UE located in a shadow area to perform the initial access procedure through the LIS.

FIG. 15 is a diagram illustrating a method for allowing the UE located in a shadow area to perform the initial access procedure through the LIS.

Referring to FIG. 15, the BS may transmit a search signal including synchronization/system information, and the LIS may search for the UE while changing the LIS beam based on the search signal. The UE may perform synchronization and acquire system information by receiving the search signal, and may transmit the initial access signal to the BS through the LIS based on the search signal. The UE may perform synchronization and obtain system information from the search signal, and may transmit an initial access signal to the base station through the LIS based on the search signal. The initial access signal may include control information for requesting the LIS to fix an uplink LIS beam. Next, the BS may receive the initial access signal from the LIS, and may transmit the initial access response signal (including L1/L2 information) based on the initial access signal. In this case, the initial access response signal may include control information for requesting the LIS to fix the UL/DL LIS beam.

Specifically, the UE may be located in a shadow area within the BS coverage. In this case, the UE may be in an idle state in which communication between the UE and the BS is disconnected. The UE may attempt to resume communication with the BS through the LIS within the BS coverage. That is, while communication between the BS and the UE is disconnected, the BS and the LIS may be in a connectable state (i.e., a state in which signals can be recognized). On the other hand, the connectable state between the BS and the LIS does not mean that data is actively demodulated and received. In addition, it can be assumed that the BS shadow area including the UE is smaller in size than a coverage starting from the LIS. The BS may acquire the LIS operation information within the BS coverage in advance. Specifically, the BS may specify the location information of the LIS based on the LIS operation information, or may distinguish or identify the LIS based on the LIS operation information. In addition, the BS may recognize the capability (e.g., reflection pattern operation capability, etc.) of the LIS based on the above LIS operation information.

Information related to the communication qualification related to the UE operation in which the UE located in the shadow area performs the initial access procedure through the LIS may be configured in advance.

Specifically, the BS may transmit information on the LIS located in the coverage to the UE in advance. The BS may include at least one of the following information types in information about the LIS included in the BS coverage, and may thus inform the UE of the resultant information.

Information about whether the LIS is included in the service area (coverage)
LIS identifier (ID)
Number of LIS beam patterns for UE search (or the number of LIS reflection patterns for UE search)
Number of LIS beam patterns for data service (or the number of LIS reflection patterns for UE search)
Time and/or frequency resource candidate group for LIS relay-based initial access
Time and/or frequency resource candidate group for LIS relay-based data transmission/reception
Configuration information (e.g., a length of a beam control section, a length of a signal section, a transmission period, etc.) for signals (e.g., a synchronization and system information broadcast signal, an initial access signal, an initial access response signal, etc.) required for LIS relay-based initial access procedure
LIS beam transition time (i.e., a (maximum) time taken from a beam transition instruction time to the actual beam transition time)

Alternatively, the UE may transmit, to the BS, information about whether the UE can access the BS using the LIS.

Next, the following resource allocation and signal configuration can be pre-configured for LIS-based communication.

First, a time section for a downlink (DL) signal that is transmitted by the BS through the LIS may be classified into a beam control section and a signal transmission section. The BS may control a DL-related LIS transmission beam that is transmitted to the UE through the LIS using a downlink signal in the beam control section. Here, within the DL beam control section, the BS may transmit a downlink (DL) signal that includes at least one of ① DL LIS beam index, ② uplink (UL) LIS beam index, ③ information related to the start of downlink LIS beam transition, ④ information related to the end of the downlink LIS beam transition, and ⑤ information related to enabling/disabling of downlink LIS beam transition.

In addition, the BS may pre-configure a specific time and/or frequency resources (or LIS resources) distinguished from the existing UEs directly communicating with the BS for communication with the UEs configured to use the LIS. Alternatively, the LIS beam controlled through the BS and/or the UE may be configured differently according to frequency and/or time resources. In this case, the beam control information included in the LIS beam control section can be modulated and demodulated in various ways. For example, the beam control information may be modulated by an amplitude modulation (AM) method. The beam control information may be modulated by an amplitude shift keying (ASK) method. Alternatively, the beam control information may be modulated by a phase shift keying (PSK) method.

Hereinafter, the configuration of the beam control section in which the beam control information or the LIS control signal is transmitted will be described in detail.

On the other hand, when the beam transition of the LIS means transition of the direction of the beam formed according to the reflection pattern transition of the LIS, the LIS control signal may be a control signal for requesting a change in the reflection pattern for beam transition of the LIS (or for controlling the reflection pattern of the LIS).

Figure 16:
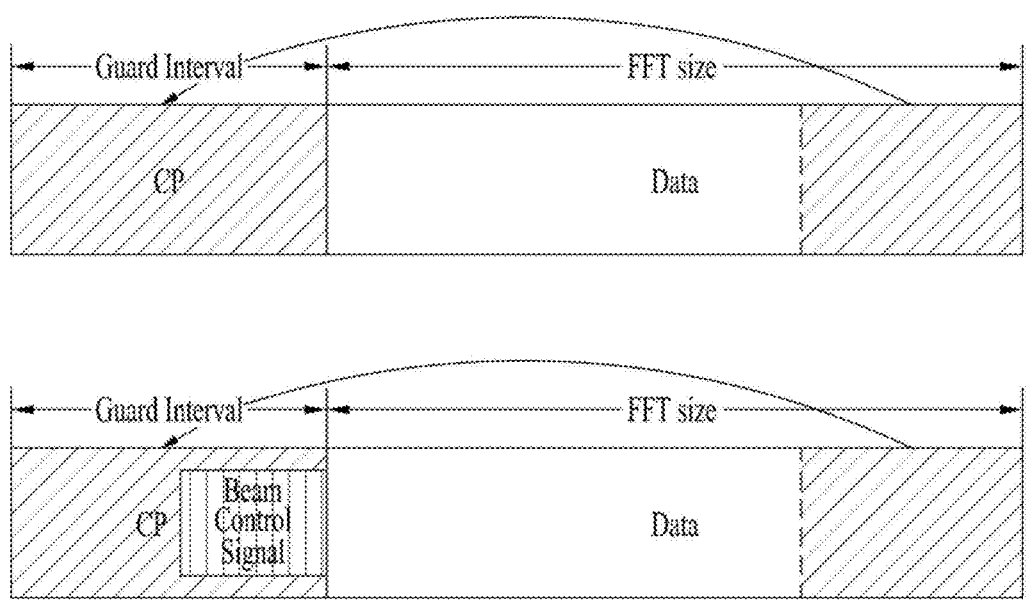
FIG. 16 is a diagram illustrating a beam control section to which the beam control information is transmitted.

FIG. 16 is a diagram illustrating a LIS control section (or a beam control section) in which a LIS control signal (or beam control information) is transmitted.

Referring to FIG. 16, the LIS control section may be allocated as a part of a cyclic prefix (CP) period of orthogonal frequency division multiplexing (OFDM) symbol resources. In this case, the end time point of the LIS control section may be allocated to be the same as the end time point of the CP period.

Alternatively, the LIS control information or the LIS control signal transmitted within the beam control section may be applied to the closest signal transmission section after lapse of a predetermined time offset. In other words, the LIS beam control information may include control information on a signal transmission section located after the predetermined time offset from the LIS control section. Here, the time offset may be predetermined by the BS based on the acquisition and beam transition time of the LIS beam control information.

On the other hand, the LIS control section and the signal transmission section may be preset by the BS, or allocation information for the above sections may be included in the UE search signal that is transmitted from the BS to the UE through the LIS.

Figure 17:
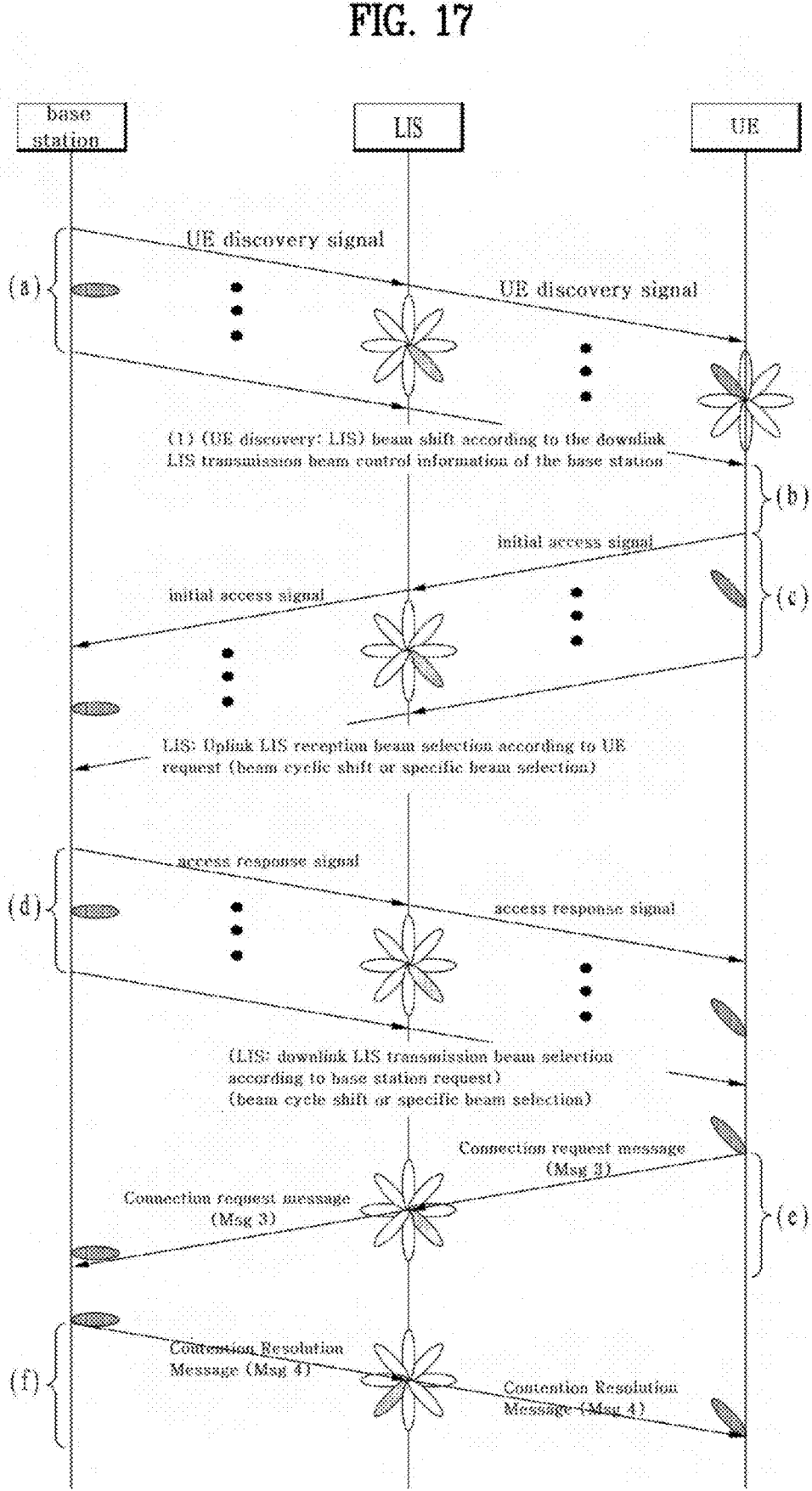
FIG. 17 is a diagram illustrating a method for allowing the BS and/or the UE to perform the initial access procedure through the LIS.

FIG. 17 is a diagram illustrating a method for allowing the BS and/or the UE to perform the initial access procedure through the LIS.

Referring to FIG. 17, the BS and/or the UE may perform UE search and synchronization through the LIS (a).

On the other hand, for convenience of description, the UE or BS operation in which the UE or the BS receives or transmits signals through the LIS may include an operation for transmitting or receiving signals to or from the BS or UE by allowing signals to be reflected from the LIS. The LIS transmission beam or the LIS reception beam may also include a beam that is reflected by or incident on the LIS reflection pattern, and transition (or shifting) of the LIS transmission beam or transition of the LIS reception beam may refer to a transition in the direction of the LIS transmission beam or the LIS reception beam. Furthermore, the LIS control signal for the LIS transmission beam or the LIS reception beam transmitted by the BS n or the UE may refer to a control signal for controlling the reflection pattern of the LIS for transition of the LIS transmission beam or the LIS reception beam.

The BS may transmit the UE search signal toward the LIS in preconfigured time, frequency, and/or code (sequence) resources. In other words, the BS may transmit the UE search signal toward the LIS based on the above-described resource allocation and signal configuration. The UE search signal may include a synchronization signal and/or system information. In addition, the UE search signal transmitted by the BS toward the LIS may include at least one of the following LIS information.

Base station (BS) ID (e.g. cell ID, virtual cell ID)
Identifier for a beam of the BS
LIS identifier (ID)
LIS beam index
Time domain resource index
Frequency resource index
Code (sequence) index
LIS control section, Signal transmission section Alternatively, the BS may determine a beam search section (i.e., a second search section) for a UE located in a coverage for LIS(s) to be a part of the beam search section (i.e., a first search section) for a UE located in the BS coverage. In this case, the BS may use separate time, frequency and/or code (sequence) resources during a separate period different from the beam search section for the UE located in the coverage, so that the time, frequency, and/or code resources can be used to search for LIS(s) located in the coverage, a UE located in the coverage, and beams for the LIS(s) and the UE. In other words, the BS may set period, time, frequency, and/or code resources used for transmission of the beam search signal in the second search section in a manner that the resultant period, time, frequency, and/or code resources can be distinguished from period, time, frequency, and/or code resources for the beam search signal in the first search section.

The LIS may search for UEs located in the LIS coverage using a subset of its own beam set upon receiving the UE search signal from the BS (or upon detection of the UE search signal). Alternatively, the LIS may search for UEs located in the LIS coverage using a subset of its own reflection pattern set upon receiving the UE search signal from the BS (or upon detection of the UE search signal). The LIS may recognize (or sense) the signal incident from the BS, and may sequentially perform searching based on its own beam set (or the reflection pattern set). This process is repeated until the beam of LIS is selected. As an example in which the BS signal of the LIS is recognized (or sensed), the above-described process can be performed based on either a signal strength applied to a unit cell of the LIS or a reflection pattern related to the signal strength. Alternatively, the LIS may sequentially shift the LIS transmission beam for downlink based on LIS control information received from the BS.

The UE may receive the UE search signal received from the BS configured to use the LIS, and may acquire synchronization, system information, LIS information and/or LIS control information (or a LIS control signal) based on the received UE search signal (b). The UE may select the strongest signal as the LIS transmission beam (or the first LIS beam) for downlink based on the UE search signals received from the LIS transmission beam for the at least one downlink. The UE may select a beam corresponding to a pair of reception beams applied to the case in which the UE receives the LIS transmission beam for the strongest downlink. Here, the first LIS beam may correspond to the LIS transmission beam for downlink having the highest signal strength at the UE from among LIS transmission beams for the plurality of downlinks on which the UE search signal is received.

Next, the UE can perform initial access to the BS through the LIS (c).

The UE may generate an initial access signal using information acquired when the UE search signal is received through the LIS, and may transmit the generated initial access signal to the BS using the LIS. The initial access signal is repeatedly transmitted until the UE recognizes that a predetermined LIS reception beam for uplink is selected from the BS. In other words, when the UE receives, from the BS, a response signal indicating that the LIS reception beam for uplink was selected from the BS, through the BS, the process of transmitting the initial access signal can be completed.

Alternatively, the UE may transmit, to the BS, information (or first LIS beam information) for the LIS transmission beam for downlink obtained through the UE search signal. The UE may select a beam corresponding to the reception beam for the LIS transmission beam (or the first LIS beam) for downlink obtained through the UE search signal as the UE uplink beam (or the first UE transmission beam). The UE may transmit the LIS control information for uplink to the LIS. Alternatively, the UE may transmit the initial access signal including the LIS control information. Alternatively, the initial access signal or the uplink LIS control signal may include information requesting that the LIS fix the first LIS beam (or fix the reflection pattern related to the first LIS beam).

The LIS may transition (or shift) the LIS reception beam for uplink through the change of the reflection pattern based on the uplink LIS control information (or the LIS control signal for uplink) transmitted by the UE. The LIS may transition (or shift) the reflection pattern in a manner that a specific LIS reception beam for uplink requested by the UE can be formed, and may relay the initial access signal to the BS using a specific LIS reception beam according to the transition reflection pattern. Alternatively, upon receiving the LIS control signal requesting beam transition (or transition of the reflection pattern) from the UE, the LIS may repeatedly relay or reflect the initial access signal to the base station while sequentially shifting the LIS reception beam for uplink (or while shifting the LIS reflection pattern for uplink) in a cyclic shift manner based on the control signal.

The BS may obtain first link information for a link between the LIS and the UE from the initial access signal received through the LIS. Specifically, the BS may acquire, as the first link information, information on the LIS transmission beam (or the first LIS beam information) for the UE-selected downlink acquired based on the initial access signal and/or information on a particular LIS reception beam for uplink based on the initial access signal. For example, the BS may acquire, as the first link information, the second LIS beam information and the first LIS beam information indicating information on the LIS reception beam for uplink corresponding to the initial access signal having the strongest reception signal strength from among the at least one received initial access signal.

Next, the BS may transmit an initial response signal to the UE through the LIS (d).

The base station may generate an initial access response signal based on the first link information obtained from the initial access signal. The BS may transmit the initial access response signal to the UE through the LIS. The BS may transmit the LIS control signal for downlink to the LIS. Alternatively, the BS may transmit the initial access response signal including the LIS control signal for the downlink to the UE through the LIS. Alternatively, the BS may transmit an initial access response signal including the acquired first link information to the UE through the LIS.

Alternatively, the BS may transition (or shift) the LIS transmission beam for the downlink of the LIS using the LIS control signal for the downlink. Specifically, the BS may instruct the LIS to perform transition (or shifting) of the LIS beam for downlink based on information on the first LIS beam included in the initial access signal, or may instruct the LIS to perform transition of the LIS transmission beam for downlink corresponding to the second LIS beam. For example, the BS may instruct transition or fixing to the first LIS beam, or may instruct transition to the LIS transmission beam (or a paired downlink LIS transmission beam) corresponding to the selected second LIS beam.

The LIS may transition the LIS transmission beam for the downlink according to the LIS control signal for the downlink transmitted by the base station. The LIS may transition the LIS transmission beam for the downlink to a specific downlink LIS transmission beam requested by the BS, and may relay an initial access response signal to the UE based on the specific downlink LIS transmission beam. In other words, the LIS may change or transition the reflection pattern of the LIS for downlink in a manner that a specific LIS transmission beam is formed on downlink based on the LIS control signal for downlink transmitted by the BS. Alternatively, when a transition request is made in the LIS control signal for the downlink, sequential transition of the LIS transmission beams (or the LIS reflection pattern for downlink) for downlink is performed in a cyclic shift manner and at the same time the initial access response signal can be relayed to the UE.

The UE may acquire second link information on the link between the LIS and the UE from the initial access response signal received through the LIS. The UE may acquire the LIS transmission beam information for downlink and/or the LIS reception beam information for uplink (or the information on the reception beam for the selected uplink) based on the second link information.

Next, the UE may transmit a connection request message (Msg3) to the BS through the LIS (e).

The UE may generate a connection request message (Msg3, connection request) signal including LIS control information for the uplink, and may transmit the generated connection request message to the BS through the LIS. The UE may control the LIS reception beam for uplink (or the LIS reflection pattern for uplink) based on information on the LIS reception beam for uplink used for initial access signal transmission, or may control the LIS reception beam for uplink (or the LIS reflection pattern for uplink) based on information on the second LIS reception beam received from the BS.

The LIS may transition the LIS reception beam for uplink (or the LIS reflection pattern for uplink) according to the uplink LIS control information transmitted by the UE. The LIS may transition to a particular LIS reception beam (or a particular LIS reflection pattern for uplink) for the uplink requested by the UE, and may relay a connection request message to the BS using such transition. In other words, the LIS may transition the LIS reception beam for uplink (or the LIS reflection pattern for uplink) based on the LIS control signal for the uplink. Alternatively, upon receiving the UE beam transition request included in the LIS control signal for the downlink, the LIS can sequentially shift the LIS reception beams for uplink (or the LIS reflection pattern for uplink) in a cyclic shift (CS) manner, and at the same time can repeatedly relay the connection request message to the BS.

The BS may receive connection request message (Msg3) information from the UE through the LIS. Alternatively, the BS may acquire connection request message (Msg3) information from the strongest received beam after receiving at least one connection request message (Msg3) transmission signal. In other words, the BS may acquire information on the connection request message from the LIS reception beam having the highest signal strength from among the LIS reception beams for the uplink.

Next, the BS and/or the UE may transmit and receive a contention resolution message (Msg4) through the LIS (f).

The BS may generate a contention resolution message (Msg4, contention resolution) signal including downlink LIS control information, and may transmit the contention resolution message signal to the UE through the LIS. The BS may generate a control signal for downlink that controls a downlink LIS transmission beam (or the LIS reflection pattern for downlink) using the downlink LIS reception beam information used for initial access response signal transmission.

The LIS may transition the LIS transmission beam (or the LIS reflection pattern for downlink) for downlink according to the downlink LIS control information or the downlink LIS control signal transmitted by the BS. The LIS may transition a particular LIS reflection pattern for downlink in a manner that a specific LIS transmission beam for downlink requested by the BS is formed, and may relay a contention resolution message signal to the UE using such transition. The LIS may relay the contention resolution message to the UE while shifting the LIS transmission beam for downlink (or the LIS reflection pattern for downlink) in a cyclic shift manner upon receiving the beam transition request from the BS.

The UE may receive contention resolution message (Msg4) information from the BS through the LIS. Alternatively, the UE may receive one or more contention resolution message (Msg4) signals and obtain contention resolution message (Msg4) information from the strongest received beam.

Figure 18:
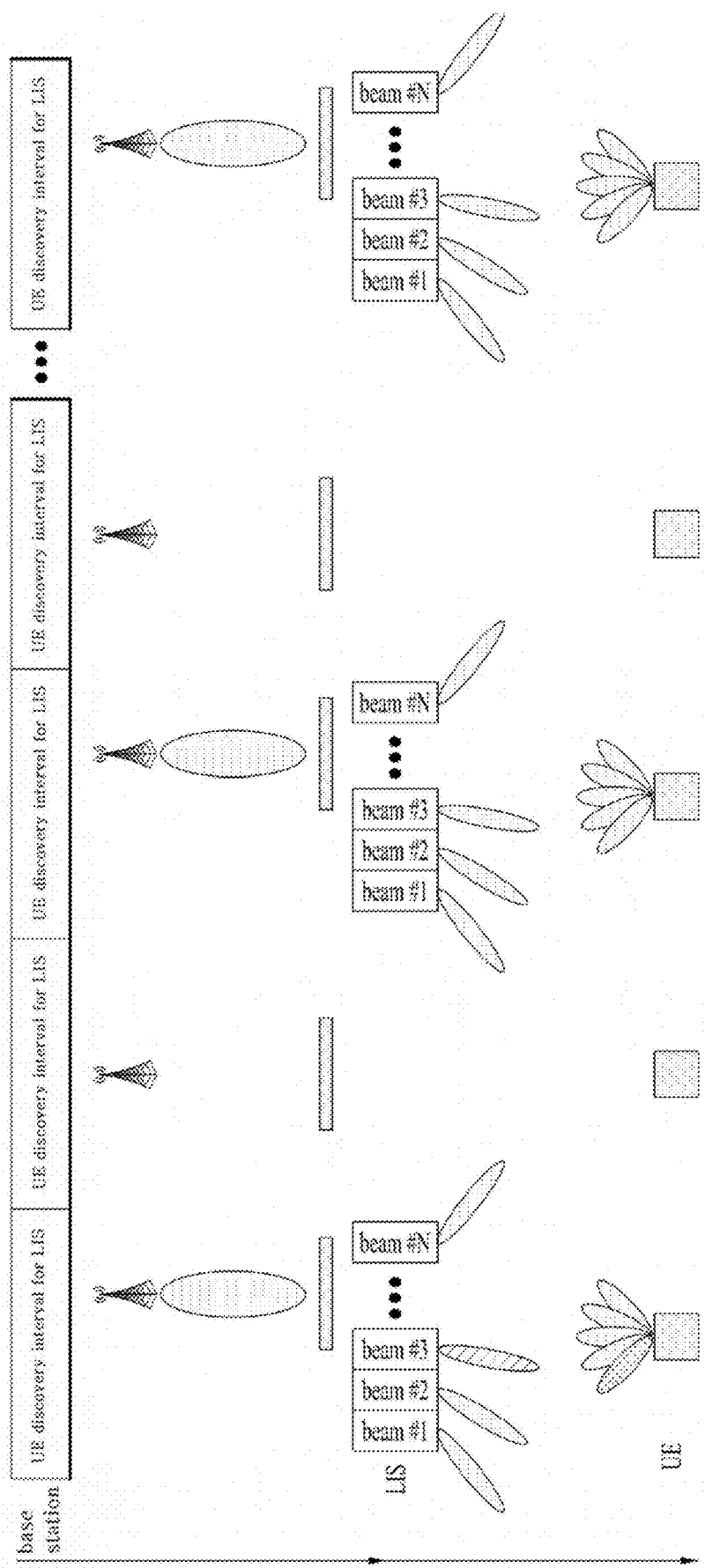
FIGS. 18 and 19 are diagrams illustrating a UE search section to which a LIS-based search signal is transmitted, and a transmission period of the initial access signal.
Figure 19:
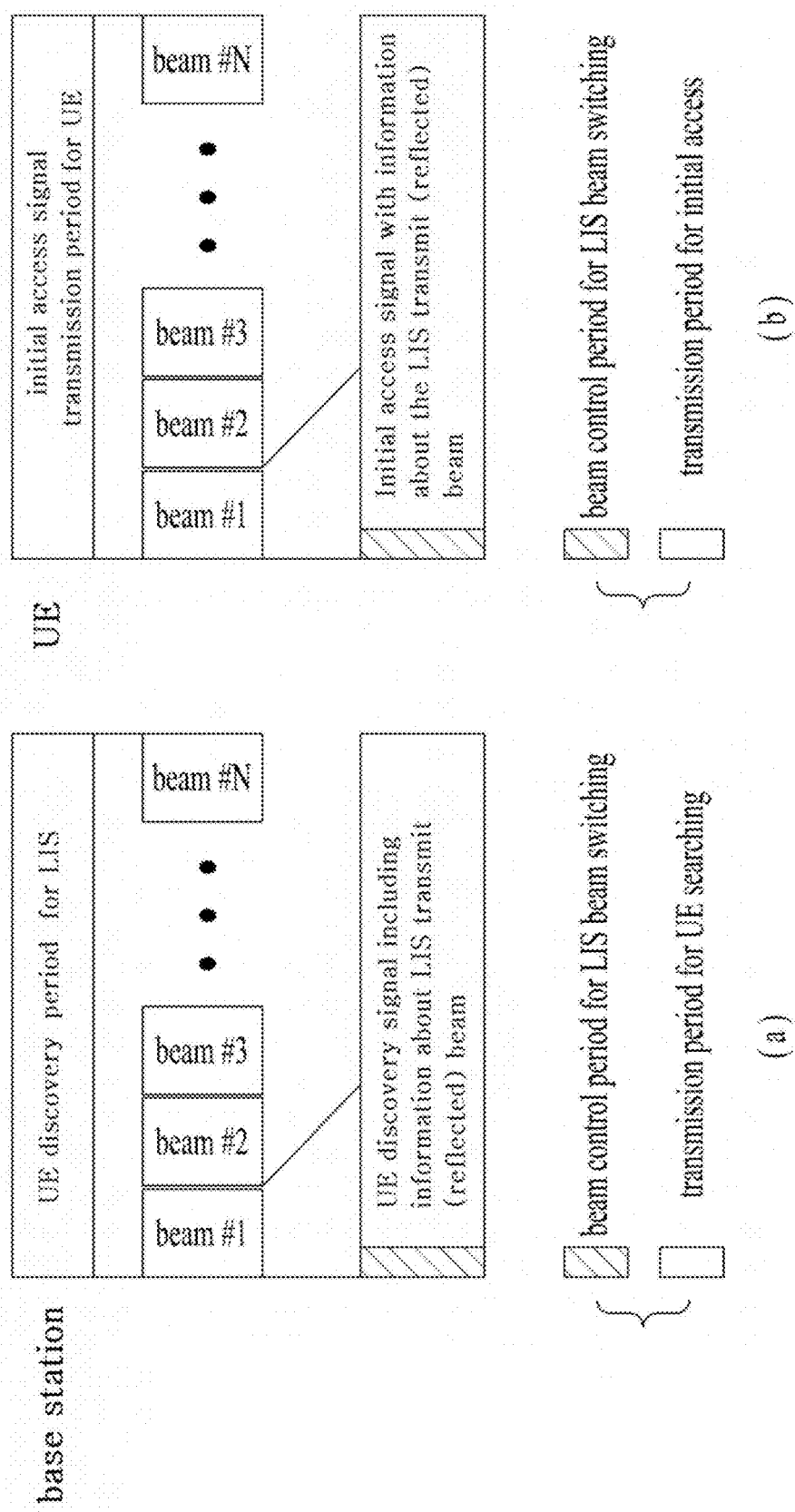

FIGS. 18 and 19 are diagrams illustrating not only a UE search section to which the LIS-based search signal is transmitted, but also a transmission section of the initial access signal.

Referring to FIG. 18, a section preset in relation to UE search may include a plurality of UE search sections and a plurality of UE non-search sections.

The UE search section may be divided into a control section and a signal transmission section. The BS may transmit a UE search signal to the UE through the LIS in the UE search section.

The BS may transmit the LIS control signal for the downlink using a control period within the UE search section. The LIS control signal for the downlink may be a control signal that instructs the LIS to indicate UE search start, UE search end, LIS beam transition, etc. For example, the LIS control signal for the downlink may be modulated by an amplitude modulation (AM) method, an amplitude shift keying (ASK) method, or a phase shift keying (PSK) method. The LIS control signal for the downlink may be applied to the closest UE search signal transmission section after lapse of a time offset corresponding to a control information acquisition and beam transition time on the LIS. Here, the time offset may be instructed by the BS. The LIS control signal for the downlink may be a beam transition request signal or a beam change request signal. In other words, the LIS control signal for the downlink may be a signal that can instruct the LIS to transition the reflective pattern to change the LIS transmission beam for the downlink.

Here, the beam transition request signal is a signal that requests the LIS to transition the direction of the LIS beam for the downlink (or the direction of the LIS beam through transition of the LIS reflection pattern for the downlink) based on the beam subset (or the LIS reflection pattern subset) of the LIS. The beam change request signal is a signal that requests the BS to change the direction of the LIS beam (or the LIS reflection pattern for the downlink) for the downlink according to the beam index (or the order of the beam indexes) directly instructed by the BS.

The BS may transmit a beam change request signal that instructs cyclic shift of the LIS transmission beam for the downlink according to a preconfigured pattern. The beam change request signal may include the LIS beam index. Alternatively, the beam change request signal may include a beam change command in an ON/OFF manner. In this case, when the beam change command is set to an ON command, the LIS may perform a beam change (or a change in the LIS reflection pattern for the downlink) according to the beam index included in the beam change request signal.

Alternatively, the BS may transmit, to the LIS, a UE search signal including BS and system information, such as a downlink synchronization signal and/or master information block (MIB) information, within the UE search section. Alternatively, the UE search information may include various kinds of information as described with reference to FIG. 15.

Referring to FIG. 19(a), the LIS may transition or change the direction of the LIS beam for downlink based on the LIS control signal for the downlink received from the BS. The beams #1 to #N may be beams that are instructed by the BS or may be beams of the beam subset pre-configured in the LIS.

Specifically, when the beam transition request signal from the BS is detected, the beam indexes are continuously CS(cyclic shift)-processed in the beam subset of the LIS, so that the direction of the LIS beam for downlink can be changed. In this case, when the LIS receives a beam transition end signal from the BS or when the beam direction for all beam indexes included in the beam subset is completely changed, transmission of the beam search signal can be completed.

Alternatively, when the LIS receives the beam change request signal or the LIS control signal for the downlink transmitted in the control period, the LIS can sequentially change the beam direction (or the reflection direction) according to the order of beam indexes included in the beam change request signal within the signal transmission period, and at the same time can relay the UE search signal transmitted from the BS in the direction of each beam. Alternatively, when the LIS receives the LIS control signal related to the beam change termination from the BS, or when the beam direction change of all beam indexes included in the beam change request signal is completed, transmission of the UE search signal can be completed.

Referring to FIG. 19(b), an initial access signal transmission period of the UE may include a control section for switching the LIS beam or the LIS reflection pattern and a signal transmission section for transmitting the initial access signal.

The UE may transmit an initial access signal within the signal transmission period using uplink resources (for initial access) included in the UE search signal transmitted from the BS. The initial access signal may be transmitted as a transmission beam for uplink corresponding to (or matching) a reception beam used upon receiving the UE search signal. Alternatively, the UE may include information requesting to fix the direction of the LIS beam for downlink or the beam index of the LIS beam in a direction corresponding to the direction in which the initial access signal is received.

The UE may transmit, to the BS, information on the LIS transmission beam for the downlink together with the initial access signal within the initial access period. For example, the UE may allow information on the LIS transmission beam on the received downlink to be included in a random access channel (RACH) signal, and may transmit the resultant RACH signal to the BS. Alternatively, the UE may transmit information on the LIS transmission beam for the preferred downlink within the control period. Alternatively, the information on the LIS transmission beam (or the first LIS beam) for the downlink may be modulated by an amplitude modulation (AM) scheme, an amplitude shift keying (ASK) scheme, or a phase shift keying (PSK) scheme.

Alternatively, the UE may transmit the LIS control signal for the uplink to the LIS in the beam control section belonging to the initial access period. In this case, the LIS control information can be applied to the signal transmission period of the closest initial access signal after lapse of the time offset corresponding to the LIS control information acquisition and beam transition time on the LIS. On the other hand, the time offset may be a value instructed by the BS.

Alternatively, the LIS beam information (or the second link information) transmitted by the UE in the initial access period may include at least one of the LIS beam index for the downlink, the LIS beam index for the uplink, the start of the LIS beam transition for the uplink, the end of the LIS beam transition for the uplink, and the LIS beam transition (enable/disable) for the uplink.

Alternatively, the UE may transmit the LIS control signal for uplink using a control section belonging to the UE initial access period. The LIS control signal for the uplink may indicate the start, end, LIS beam transition, etc. of the initial access signal. The LIS control signal for the uplink may be modulated by an amplitude modulation (AM) scheme, an amplitude shift keying (ASK) scheme, or a phase shift keying (PSK) scheme.

Alternatively, the UE may transmit, as the LIS control signal for uplink, a beam transition request signal or a beam change request signal in the control period within the initial access period. Here, the beam transition request signal is a signal that requests the LIS to transition the direction of the LIS beam for uplink based on the beam subset of the LIS. The beam change request signal is a signal that requests the UE to change the direction of the LIS beam for uplink according to the beam index (or the order of the beam index) instructed by the UE.

Alternatively, the beam change request signal may include a beam change start signal and/or a beam transition end signal. For example, the beam change start signal may include a first beam index, and the beam transition end signal may include the last beam index. That is, the beam change request signal may include information on whether the LIS beam for uplink is changed, and information on indexes from the start index to the end index of the LIS beam for uplink.

When the LIS receives information on the LIS transmission beam for the downlink in the control period belonging to the initial access period, the direction of the LIS beam for downlink can be fixed to the first LIS beam corresponding to information on the LIS transmission beam for the downlink. Alternatively, when the LIS receives the initial access start signal (or the initial access signal) transmitted in the control period belonging to the initial access signal of the UE, the reception beam index of the LIS can be initialized.

In addition, the LIS may transition or change the direction of the LIS reception beam for the uplink based on the LIS control signal for the uplink. The LIS may change the direction of the LIS reception beam for the uplink in a corresponding direction based on the LIS beam index included in the LIS control signal for the uplink. For example, the LIS may relay the initial access signal by sequentially changing the LIS beam direction for the uplink from the first beam index included in the LIS control signal for the uplink to the last beam index. Alternatively, the LIS may change the LIS beam direction for the uplink according to a pattern of the beam index included in the LIS control signal for the uplink or according to a preconfigured order of the beam indexes.

Alternatively, the LIS may sequentially transition the direction of the LIS beam for the uplink according to the beam index belonging to the beam subset based on the LIS control signal for the uplink.

FIG. 20 is a diagram illustrating a method for transmitting an initial access response signal transmitted from the BS to the UE through the LIS within an initial access response period.

Referring to FIGS. 20(a) and 20(b), the initial access response period may be divided into a control period and a signal transmission period. The BS may transmit, to the UE, a beam transition request signal in the control period in association with the initial access response signal. The beam transition request signal may include a beam transition command in an ON/OFF manner.

The BS may transmit information on the LIS beam for uplink and/or information on the LIS beam for downlink when transmitting the initial access response signal. The information on the LIS beam and/or information on the LIS beam for downlink may be modulated by the amplitude modulation (AM) scheme and the amplitude shift keying (ASK) scheme, or the LIS downlink beam information may be modulated by the phase shift keying (PSK) scheme.

Alternatively, the BS may transmit the LIS control information for the downlink together with the initial access response signal within the control period. The LIS control signal for the downlink may be modulated by the amplitude modulation (AM) scheme (AM) and the amplitude shift keying (ASK) scheme, or the LIS downlink beam information may be modulated by the phase shift keying (PSK) scheme.

Figure 21:
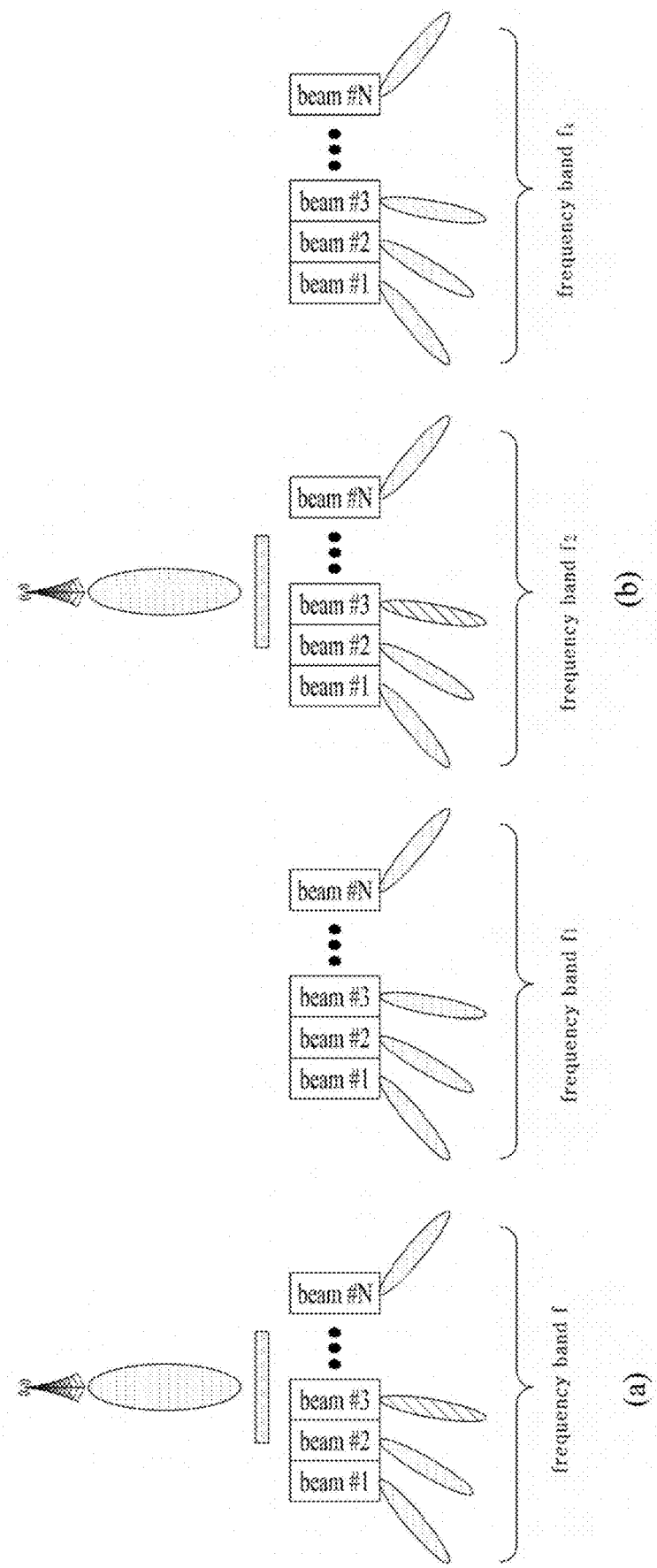
FIG. 21 is a diagram illustrating a method for operating time and frequency resources for LIS beam transition with respect to a link between the BS and the UE using a LIS relay.

FIG. 21 is a diagram illustrating a method for operating time and frequency resources for LIS beam transition with respect to a link between the BS and the UE using the LIS relay.

FIG. 21(a) is a diagram illustrating a method for distributing the LIS beam for a single frequency band to time resources. FIG. 21(b) is a diagram illustrating a method for distributing the LIS beam to frequency resources capable of being allocated to a total of K LIS relays over time.

Figure 22:
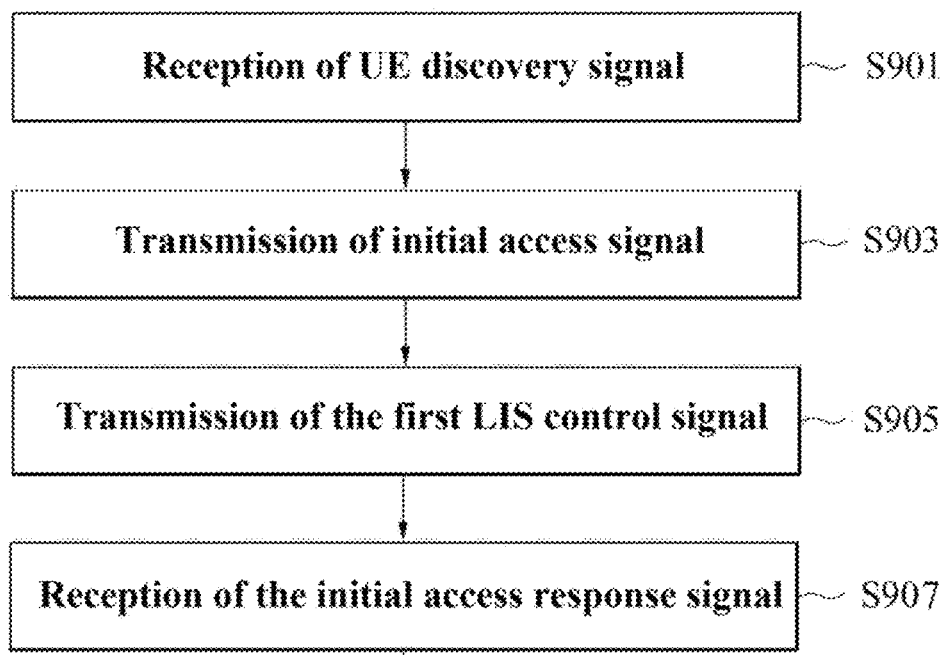
FIG. 22 is a diagram illustrating a method for allowing the UE to perform initial access to the BS using the LIS.

FIG. 22 is a diagram illustrating a method for performing the initial access to the BS through the LIS.

Referring to FIG. 22, the UE may receive a UE search signal transmitted by the BS through the LIS (S901). The UE search signal transmitted by the BS may be reflected from the LIS and transmitted to the UE. The UE may receive the UE search signal in at least one beam direction according to transition of the reflection pattern of the LIS.

Alternatively, the UE may acquire information on the BS identifier (ID), a beam index of the BS, an identifier for the LIS, and a beam index for the LIS from the UE search signal. The beam index for the LIS may be an index for the reflected beam direction that can be formed through control of the reflective pattern in the LIS. For example, the UE may control or change the reflection pattern of the LIS through a first LIS control signal including a specific beam index based on a beam index for the LIS, resulting in formation of a reflective beam corresponding to the specific beam index.

Alternatively, the UE may acquire, from the UE search signal, information on a transmission resource of the initial access signal indicating the UL signal and/or information on the LIS. Specifically, the UE search signal may include information on a control period in which the first LIS control signal is transmitted and information on a signal transmission period corresponding to a transmission period of the UE search signal.

Alternatively, the control period may be allocated within a cyclic prefix (CP) period of orthogonal frequency division multiplexing (OFDM) symbols. In this case, the BS and the UE may efficiently transmit the LIS control signal without collision with existing signals in one portion of the existing resource region without separately configuring or newly defining the resource region in which the LIS control signal for controlling the LIS is transmitted.

Alternatively, the control period may be allocated to a guard interval (or a guard period) in the existing resource region corresponding to the OFDM CP. Specifically, the sequence used in all or some parts of the guard period with respect to the guard interval (or a guard period) composed of promised sequences known to the BS and the UE may include LIS beam control information. For example, the BS and the UE may use a unique word (UW)-type guard interval (GI). The UW-OFDM may be pre-configured as the UW-type guard interval between the BS and the UE. In this case, the BS and the UE may use the recognized unique word (UW) as the CP or the GI (UW-OFDM), rather than using a portion of the rear part of the OFDM symbol interval as the CP and the GI.

In other words, the BS and the UE can efficiently transmit the LIS control signal without collision with existing signals in one portion of the existing resource region using a pre-configured guard interval (UW-OFDM).

Alternatively, the end timing point of the control period may be set or allocated to correspond to the end timing point of the CP period. In this case, when the start timing or offset of the control period is obtained from the resource allocation information, the UE can clearly specify the control period based on information on the existing CP period. In addition, the decoding effect of the LIS control signal can be greatly improved in that a part of the front part of the CP period can be secured.

Alternatively, the signal transmission period may be located after a predetermined offset from the end timing of the control period. Here, the predetermined offset may be pre-instructed or pre-configured by the BS. Specifically, the predetermined offset may be predetermined by the BS in consideration of the acquisition time of the first LIS control signal in the LIS and the time required for transition of the reflection pattern of the LIS.

Alternatively, the UE may receive at least one UE search signal in at least one reception beam direction. For example, the LIS may repeatedly transmit the UE search signal while cyclically shifting the beam direction or the reflection pattern according to the downlink LIS control signal transmitted by the BS, and the UE may receive the UE search signal in various directions. The UE may determine a transmission beam direction of the initial access signal based on at least one search signal received in the at least one reception beam direction. For example, the UE may transmit the initial access signal to the LIS in the transmission beam direction (or the first beam direction) that is matched to (or paired with) the beam direction (or the second beam direction) in which the search signal having the highest reception strength from among the at least one search signal is received.

Alternatively, the UE may transmit the initial access signal including beam direction information corresponding to the second beam direction. In this case, the LIS may fix the reflection pattern or the beam direction of the LIS so that the UE can receive the downlink signal in the second beam direction based on the initial access signal.

Next, the UE may transmit the initial access signal to the BS through the LIS based on the resource allocation information included in the UE search signal (S903). That is, the UE may transmit the initial access signal to the LIS in a resource region according to the resource allocation information, and the initial access signal may be reflected from the LIS and transmitted to the BS. At this time, the first LIS control signal may be transmitted to the LIS in the control period.

Next, the UE may transmit, to the LIS, a first LIS control signal for controlling or changing the reflection pattern of the LIS for the uplink together with the UE search signal (S905). Alternatively, the UE may allow the LIS control signal to be included in the UE search signal, and may transmit the resultant UE search signal. The LIS control signal may change the reflection pattern in the LIS such that the direction in which the UE search signal is reflected from the LIS can be changed.

Alternatively, the UE may cyclically shift the reflection pattern of the LIS or the direction of the reflection beam of the LIS with respect to the uplink signal through the first LIS control signal. For example, the UE may transmit a first LIS control signal for requesting a cyclic shift (CS) operation in which the reflection pattern of the LIS for the uplink signal or the direction of the reflective beam of the LIS can be cyclically shifted either in the reflection pattern subset of the LIS or in the beam subset, or may transmit a first LIS control signal for requesting a cyclic shift (CS) operation in which the reflection pattern of the LIS for the uplink or the direction of the LIS reflective beam is cyclically shifted according to the order of beam indexes instructed by the UE.

Next, the UE may receive the initial access response signal reflected from the LIS (S907). The initial access response signal is a signal transmitted by the BS through the LIS. The UE may obtain, from the initial access response signal, first information on the LIS beam for uplink selected or indicated by the BS and second information on the LIS beam for the downlink. Here, the first information may be information related to the direction of the LIS beam through which the BS receives the initial access signal having the highest reception strength from among the at least one initial access signal, in a situation where the LIS transitions the reflection pattern or the reflected beam direction and the at least one initial access signal is reflected from the BS.

Alternatively, the UE may control the reflection pattern of the LIS for the uplink based on the first information included in the initial access response signal. Specifically, the UE may transmit, to the LIS, a second LIS control signal for the above control based on the first information. In this case, the LIS may change or transition the reflection pattern in a manner that the LIS beam can be formed in the direction instructed by the BS based on the second LIS control signal.

Thereafter, the UE may transmit a connection request message (Msg 3) to the BS through the LIS, and may receive a contention resolution message (Msg 4) from the BS. The UE may complete the initial access procedure for the BS or the RACH procedure by receiving the contention resolution message.

Alternatively, the BS may transmit the UE search signal including information required for UE initial access to the LIS located in the coverage. The UE search signal may be reflected from the LIS so that the resultant UE search signal can be transmitted to the UE located in the shadow area. In addition, the BS may transmit the LIS control signal for downlink so as to control the LIS beam or the reflection pattern for the downlink. Alternatively, the LIS control signal for the downlink may be included in the UE search signal, so that the resultant UE search signal can be transmitted.

The BS may receive the initial access signal transmitted from the UE through the LIS. The BS may obtain, from the initial access signal, the first link information indicating information about a link between the UE and the LIS. The first link information may include LIS beam information for downlink selected or indicated by the UE and LIS beam information for uplink through which the initial access signal of the UE is received. Here, the LIS beam information for uplink may be information on the LIS beam direction along which the initial access signal having the highest signal strength from among at least one initial access signal received from the BS is received.

The BS may transmit, to the UE, the initial access response signal indicating a response of the initial access signal, through the LIS based on the initial access signal. The initial access response signal may include the first link information. The BS may allow the LIS control signal for controlling either the LIS reflection pattern for the downlink or the beam to be included in the initial access response signal, or may transmit the LIS control signal as a separate signal to the LIS.

Subsequently, the BS may receive a connection request message (Msg 3) transmitted from the UE through the LIS, and may transmit a contention resolution message (Msg 4) to the UE through the LIS based on the Msg 3. At this time, the BS may acquire second link information corresponding to the first link information based on the connection request message, and may transmit the Msg 4 including the second link information to the UE. In addition, the BS may control the Msg 4 and the LIS reflection pattern for downlink, and may transmit the LIS control signal for such control.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 23:
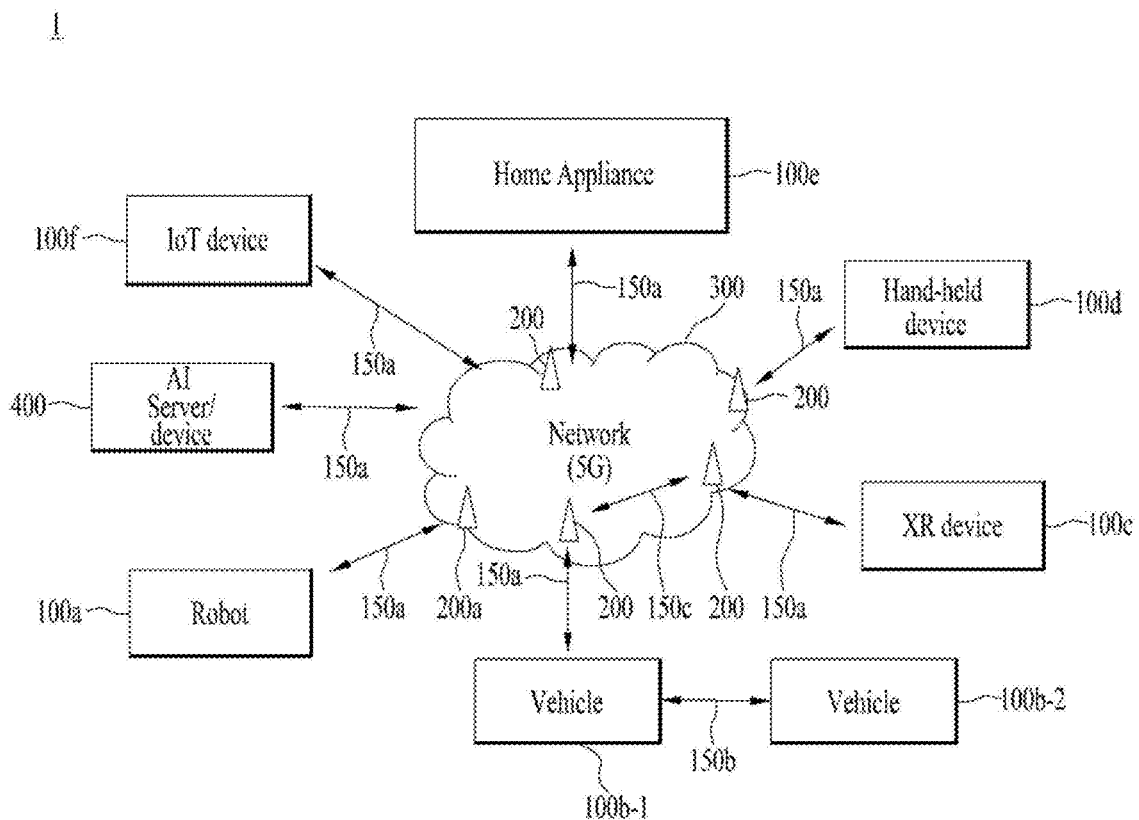
FIG. 23 illustrates a communication system applied to the present disclosure.

FIG. 23 illustrates a communication system applied to the present disclosure.

Referring to FIG. 23, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 24:
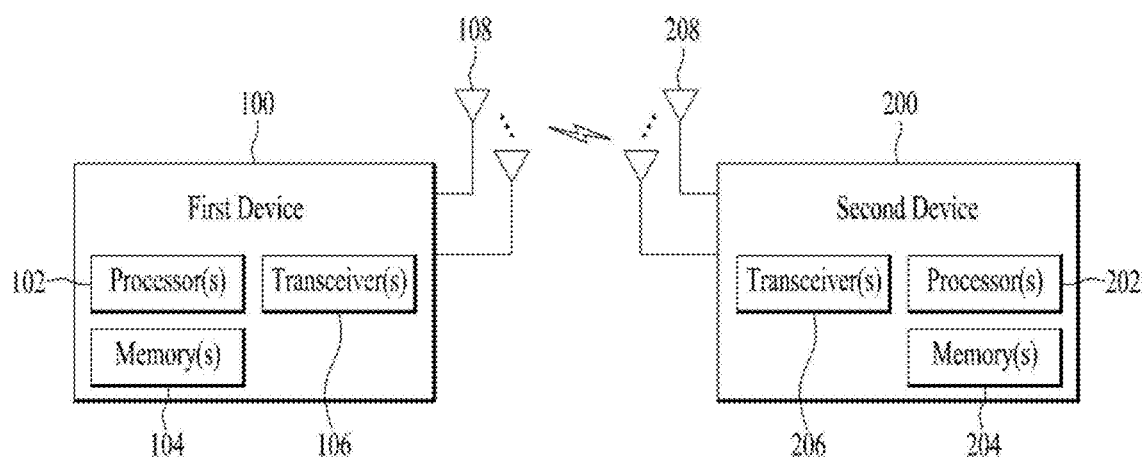
FIG. 24 illustrates wireless devices applicable to the present disclosure.

FIG. 24 illustrates a wireless device applicable to the present disclosure.

Referring to FIG. 24, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 23.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the chipset may include a processor 102 and a memory 104. The memory 104 may include at least one program capable of performing the operation related to the embodiments shown in FIGS. 16 to 22.

The UE may include a radio frequency (RF) transceiver and a processor connected to the RF transceiver. The processor 102 may receive the UE search signal transmitted by the BS through the LIS under control of the RF transceiver, may transmit the initial access signal to the BS through the LIS based on resource allocation information included in the UE search signal, and may transmit the first LIS control signal for controlling the LIS reflection pattern for the uplink signal.

Alternatively, the chipset may include a memory configured to store a program related to initial access to the BS using the LIS, and a processor 102 configured to perform the initial access to the BS based on the program stored in the memory. The processor may obtain information related to the UE search signal of the BS from the memory, and may generate the initial access signal based on the resource allocation information included in the UE search signal.

Alternatively, a computer-readable storage medium is configured to store at least one computer program including instructions such that at least one processor performs specific operations by executing the instructions. The specific operations may include an operation in which the UE search signal transmitted by the BS is received through the LIS, an operation in which the initial access signal is transmitted to the BS through the LIS based on resource allocation information included in the UE search signal, an operation in which the first LIS control signal for controlling the LIS reflection pattern for the uplink signal is transmitted, and an operation in which the initial access response signal transmitted by the BS is received through the LIS.

In addition, the UE, the chipset, or the computer program may perform the initial access procedure through the LIS in the same manner as described above in FIGS. 15 to 22.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 25:
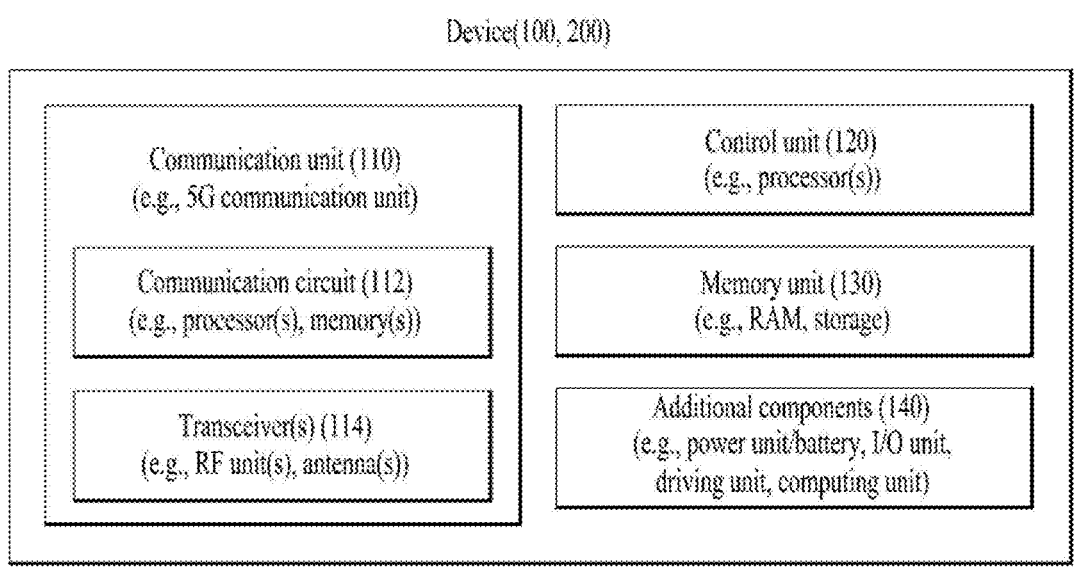
FIG. 25 illustrates another example of a wireless device to which the present disclosure is applied. The wireless device may be implemented in various forms according to use-examples/services.

FIG. 25 illustrates another example of a wireless device applied to the present disclosure. The wireless device may be implemented in various forms according to a use-case/service (refer to FIG. 23)

Referring to FIG. 25, wireless devices 100 and 200 may correspond to the wireless devices 100 and 200 of FIG. 24 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 24. For example, the transceiver(s) 114 may include the one or more transceivers 106 and 206 and/or the one or more antennas 108 and 208 of FIG. 24. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 23), the vehicles (100b-1 and 100b-2 of FIG. 23), the XR device (100c of FIG. 23), the hand-held device (100d of FIG. 23), the home appliance (100e of FIG. 23), the IoT device (100f of FIG. 23), a digital broadcast terminal, a hologram device, a public safety device, an MTC device, a medicine device, a fintech device (or a finance device), a security device, a climate/environment device, the AI server/device (400 of FIG. 23), the BSs (200 of FIG. 23), a network node, etc. The wireless device may be used in a mobile or fixed place according to a use-example/service.

In FIG. 25, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Examples of Mobile Devices to which the Present Disclosure is Applied

Figure 26:
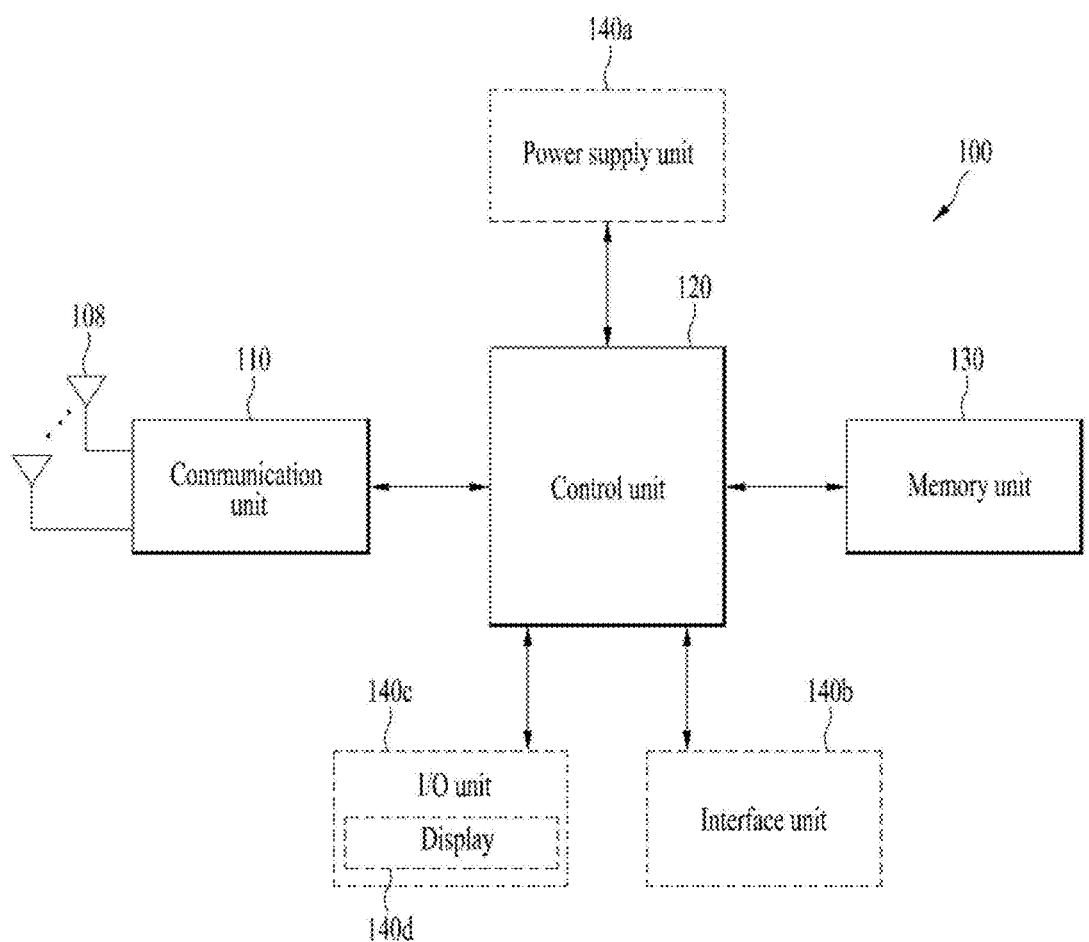
FIG. 26 illustrates a hand-held device applied to the present disclosure.

FIG. 26 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 27:
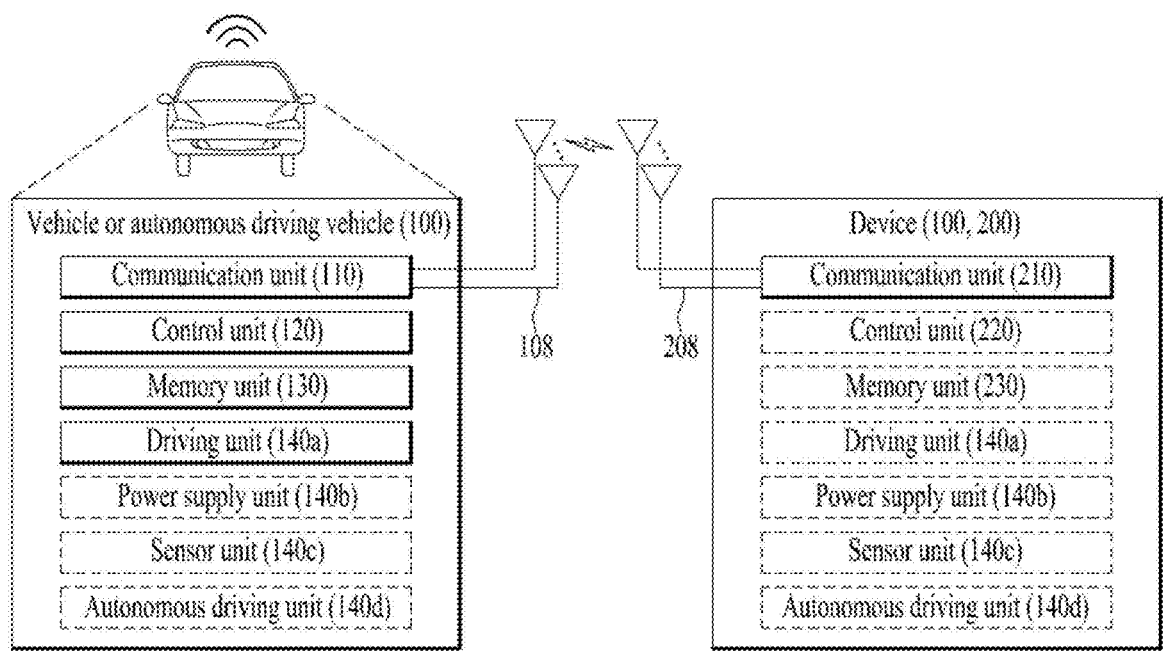
FIG. 27 illustrates a vehicle or an autonomous driving vehicle applied to the present disclosure.

Examples of Vehicles or Autonomous Vehicles to which the Present Disclosure is Applied FIG. 27 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 27, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 25, respectively The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method by a user equipment (UE) comprising:
transmitting a random access channel;
detecting downlink control information with a cyclic redundancy check (CRC) scrambled by a random access-radio network temporary identifier (RA-RNTI);
receiving a downlink data channel including a random access response message based on the downlink control information,
wherein the random access response message includes a random access response uplink grant for scheduling an uplink data channel; and
transmitting the uplink data channel based on the random access response uplink grant,
wherein the downlink control information and the downlink data channel are received from a base station via a reflection at a large intelligent surface (LIS), and the random access channel and the uplink data channel are transmitted to the base station via a reflection at the LIS,
wherein the uplink data channel is transmitted in at least one orthogonal frequency division multiplexing (OFDM) symbol, and
wherein the UE transmits a control signal for controlling a reflection pattern of the LIS to the LIS through a cyclic prefix (CP) duration applied to the at least one OFDM symbol.

2. The method according to claim 1, wherein:
the UE receives configuration information, and
the configuration information further includes a base station identifier, a beam index of the base station, an identifier for the LIS, and information for a beam index for the LIS.

3. The method according to claim 1, wherein:
the UE receives configuration information in at least one beam direction; and
the random access channel is transmitted in a first beam direction determined based on the at least one beam direction.

4. The method according to claim 3, wherein:
the first beam direction is determined based on a second beam direction in which the configuration information having the highest reception strength from among the at least one beam direction is received.

5. A user equipment (UE) comprising:
a radio frequency (RF) transceiver; and
a processor connected to the RF transceiver,
wherein the processor is configured to:
transmit a random access channel;
detect downlink control information with a cyclic redundancy check (CRC) scrambled by a random access-radio network temporary identifier (RA-RNTI);
receive a downlink data channel including a random access response message based on the downlink control information,
wherein the random access response message includes a random access response uplink grant for scheduling an uplink data channel; and
transmit the uplink data channel based on the random access response uplink grant,
wherein the downlink control information and the downlink data channel are received from a base station via a reflection at a large intelligent surface (LIS), and the random access channel and the uplink data channel are transmitted to the base station via a reflection at the LIS,
wherein the uplink data channel is transmitted in at least one orthogonal frequency division multiplexing (OFDM) symbol, and
wherein a control signal for controlling a reflection pattern of the LIS is transmitted to the LIS through a cyclic prefix (CP) duration applied to the at least one OFDM symbol.

6. A chipset comprising:
at least one processor; and
at least one memory operatively connected to the at least one processor and configured to cause the at least one processor to perform an operation when executed,
wherein the at least one processor is configured to:
transmit a random access channel;
detect downlink control information with a cyclic redundancy check (CRC) scrambled by a random access-radio network temporary identifier (RA-RNTI);
receive a downlink data channel including a random access response message based on the downlink control information,
wherein the random access response message includes random access response uplink grant for scheduling an uplink data channel; and
transmit the uplink data channel based on the random access response uplink grant,
wherein the downlink control information and the downlink data channel are received from a base station via a reflection at a large intelligent surface (LIS), and the random access channel and the uplink data channel are transmitted to the base station via a reflection at the LIS,
wherein the uplink data channel is transmitted in at least one orthogonal frequency division multiplexing (OFDM) symbol, and wherein a control signal for controlling a reflection pattern of the LIS is transmitted to the LIS through a cyclic prefix (CP) duration applied to the at least one OFDM symbol.

\* \* \* \* \*